(12) United States Patent
Katsuno

(10) Patent No.: US 9,994,083 B2
(45) Date of Patent: Jun. 12, 2018

(54) PIPE-SHAPED MEMBER AND METHOD OF CLOSING END PORTIONS OF SAME

(71) Applicant: NHK SPRING CO., LTD., Yokohama, Kanagawa (JP)

(72) Inventor: Kenji Katsuno, Kanagawa (JP)

(73) Assignee: NHK SPRING CO., LTD., Yokohama, Kanagawa (JP)

( * ) Notice: Subject to any disclaimer, the term of this patent is extended or adjusted under 35 U.S.C. 154(b) by 0 days. days.

(21) Appl. No.: 15/303,133

(22) PCT Filed: Mar. 31, 2015

(86) PCT No.: PCT/JP2015/060146
§ 371 (c)(1),
(2) Date: Oct. 10, 2016

(87) PCT Pub. No.: WO2015/156173
PCT Pub. Date: Oct. 15, 2015

(65) Prior Publication Data
US 2017/0028808 A1    Feb. 2, 2017

(30) Foreign Application Priority Data

Apr. 10, 2014  (JP) .................................. 2014-080839
Jul. 24, 2014   (JP) .................................. 2014-150434

(51) Int. Cl.
*B60G 21/055*    (2006.01)
*F16F 1/16*       (2006.01)
(Continued)

(52) U.S. Cl.
CPC ......... *B60G 21/055* (2013.01); *B21D 41/045* (2013.01); *B21D 53/88* (2013.01);
(Continued)

(58) Field of Classification Search
CPC .......... B60G 21/055; B60G 2204/1224; B60G 2202/135; B60G 2206/427; F16F 1/16
See application file for complete search history.

(56) References Cited

U.S. PATENT DOCUMENTS 6,435,531 B1 *   8/2002  Acker ................... B60G 11/20
                                              280/124.107
2003/0173001 A1   9/2003  Smith
(Continued)

FOREIGN PATENT DOCUMENTS

CN    102164760 A    8/2011
CN    202278948 U    6/2012
(Continued)

OTHER PUBLICATIONS

Chinese Office Action with English Translation, Chinese Patent Application No. 201580011095.X, dated May 26, 2017, 17 pgs.
(Continued)

*Primary Examiner* — James A English
(74) *Attorney, Agent, or Firm* — Volpe and Koenig, P.C.

(57) ABSTRACT

A pipe-shaped member of the present invention is a pipe-shaped member (1) which includes a flat plate portion (1*h*1, 1*h*2) placed in at least one end portion (1*a*1) of two end portions of the pipe, formed in a flat plate shape, and including groove-shaped recessed portions (ta1, tb1, tb2) formed in one and another extended surfaces in the flat plate shape. The recessed portions (ta1, tb1, tb2) are formed such that the flat plate portion (1*h*1, 1*h*2) has at least a substantially W-shape, in a direction crossing a longitudinal direction of the flat plate portion (1*h*1, 1*h*2), and with a depth not reaching a boundary (1*ha*) between one plate (1*h*1) and the other plate (1*h*2) of the flat plate portion (1*h*1, 1*h*2).

13 Claims, 17 Drawing Sheets

(51) Int. Cl.
*B21D 53/88* (2006.01)
*B21D 41/04* (2006.01)

(52) U.S. Cl.
CPC ............ *B60G 21/0551* (2013.01); *F16F 1/16* (2013.01); *B60G 2202/135* (2013.01); *B60G 2204/1224* (2013.01); *B60G 2206/012* (2013.01); *B60G 2206/427* (2013.01); *B60G 2206/81* (2013.01); *B60G 2206/8102* (2013.01)

(56) References Cited

U.S. PATENT DOCUMENTS

| | | | |
|---|---|---|---|
| 2006/0059974 A1* | 3/2006 | Park | B21D 41/045 72/398 |
| 2009/0174165 A1* | 7/2009 | Fader | B60G 21/055 280/124.106 |
| 2010/0225083 A1* | 9/2010 | Jung | B60G 21/055 280/124.107 |
| 2011/0101630 A1* | 5/2011 | Sakai | B21D 7/00 280/5.506 |
| 2011/0169242 A1* | 7/2011 | Kuroda | B29C 45/14221 280/124.165 |

FOREIGN PATENT DOCUMENTS

| | | |
|---|---|---|
| JP | 60-020404 U1 * | 2/1985 |
| JP | 02-283519 A | 11/1990 |
| JP | 2008-143313 A * | 6/2008 |
| JP | 2010-076540 A | 4/2010 |
| JP | 2013-504464 A | 2/2013 |

OTHER PUBLICATIONS

International Search Report, PCT/JP2015/060146, dated Jun. 30, 2015, 2 pgs.

* cited by examiner

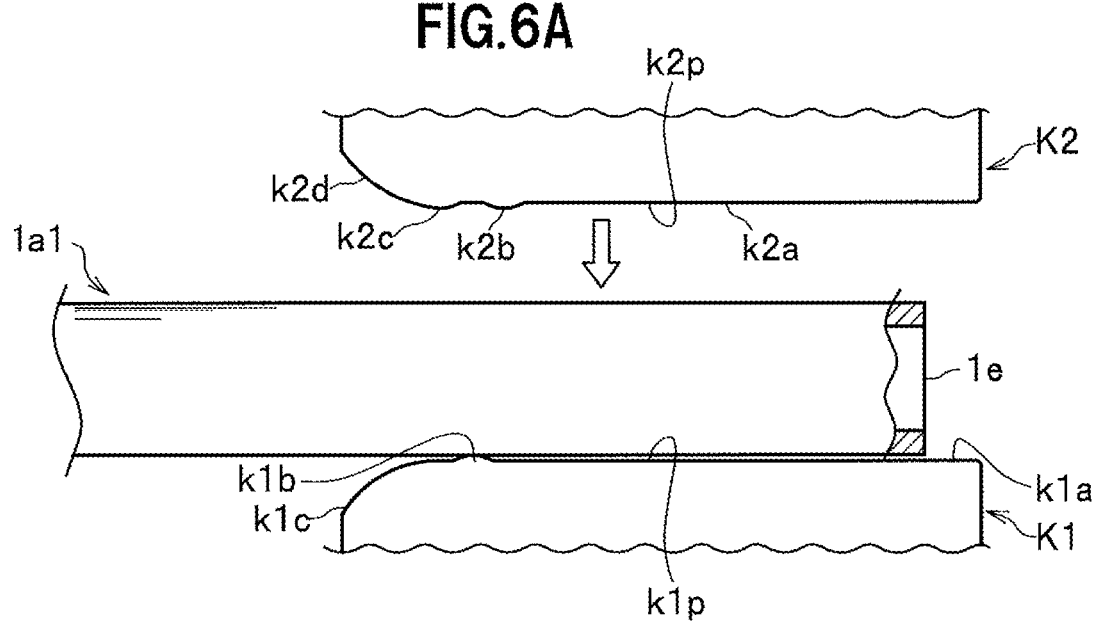
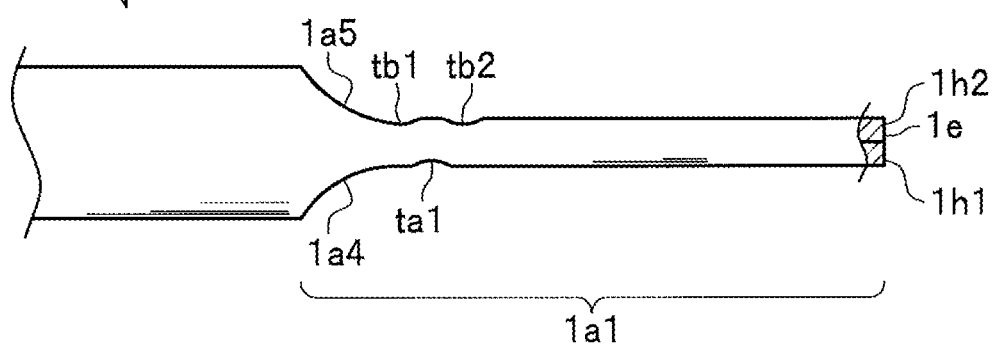

PIPE-SHAPED MEMBER AND METHOD OF CLOSING END PORTIONS OF SAME

TECHNICAL FIELD

The present invention relates to a pipe-shaped member whose end portions are closed, and a method of closing the end portions of the pipe-shaped member.

BACKGROUND ART

A vehicle includes a pair of suspension apparatuses and a stabilizer at left and right front wheels. The suspension apparatuses are attached to the wheels, and absorbs or reduces shock transmitted from a road surface to a vehicle body via the wheels. The stabilizer inhibits positional deviations of the left and right wheels, and enhances roll stiffness of the vehicle body. Furthermore, the suspension apparatuses are linked to the stabilizer using stabilizer links.

A hollow pipe is used for the stabilizer for the purpose of reducing the weight of the vehicle (see Patent Literature 1).

FIG. 12 is a perspective view showing a conventional stabilizer.

The stabilizer 101 includes: torsion arm portions 101a; and a torsion bar portion 101b whose end portions the torsion arm portions 101a are respectively joined to.

Left and right end portions 101a1 of the stabilizer 101 are each formed into a flat plate shape by hot forging because the left and right end portions 101a1 are bolted to the respective stabilizer links.

Since the stabilizer 101 uses the hollow pipe, there is likelihood that the stabilizer 101 deteriorates due to rust and the like from both its outer side (from outside its outer surface) and its inner side (from inside its inner surface) over time. Particularly because it is difficult to apply surface treatment such as painting to the inside of the stabilizer 101, the inside of the stabilizer 101 rusts and corrodes when water enters the stabilizer 101. Accordingly, the durability of the stabilizer 101 is highly likely to decrease.

Against this background, it is desired that the end portions 101a1 be watertightly closed in order that no water enters the stabilizer 101 when the left and right end portions 101a1 of the stabilizer 101 are plastically deformed into the flat plate shape.

CITATION LIST

Patent Literature

Patent Literature 1: Published Japanese Translation of PCT International Application No. 2013-504464

SUMMARY OF INVENTION

Technical Problem

Meanwhile, the above-mentioned step may cause a phenomenon where although the end portions 101a1 of the stabilizer 101 are closed, the thus-closed end portions 101a1 remain partially open while not fully closed.

Otherwise, even after the end portions 101a1 of the stabilizer 101 are once closed, there is likelihood that unexpected shocks during transportation or in a manufacturing and fitting step lower the close-contact quality of the end portions 101a1.

Loss in the closing quality of the stabilizer 101 increases likelihood that water enters the stabilizer 101 and thereby decreases the durability of the stabilizer 101. Particularly in a case where the stabilizer 101 is used under a condition where variations in temperature are large, a drop in temperature causes dew condensation inside the stabilizer 101, and decreases the pressure inside the stabilizer 101 so that the stabilizer 101 absorbs moisture from the outside.

Moreover, the end portions 101a1 are bent after being formed by pressing into the flat plate shape (see FIG. 13) in some cases. This causes concern that: inner and outer sides of each closed end portion 101a1 are displaced in opposite directions; and resultant application of excessive force to the end portion 101a1 damages the closing quality. FIG. 13 is a perspective view showing another example of the conventional stabilizer.

In view of this, an object of the present invention is to provide a highly-durable and highly-reliable pipe-shaped member whose end portions are kept closed even in a case where the end portions are bent after closed, and a method of closing the end portions.

Solution to Problem

To solve the above problems, a pipe-shaped member of a first invention is a pipe-shaped member formed from a hollow pipe which includes: a flat plate portion placed in at least one end portion of two end portions of the pipe, and formed in a flat plate shape, with groove-shaped recessed portions formed in one and another extended surfaces in the flat plate shape, wherein the recessed portions are formed such that the flat plate portion has at least a substantially W-shape, in a direction crossing a longitudinal direction of the flat plate portion, and with a depth not reaching a boundary between one and another plates of the flat plate portion.

According to the pipe-shaped member of the first invention, the end portion is formed into the flat plate shape, and the recessed portions are formed in the one and other extended surfaces in the flat plate shape such that the flat plate portion has at least a substantially W-shape. For this reason, even in a case where external forces are applied to the pipe-shaped member, resistance against shifts in opposite directions of the one and other surfaces is large, as well as internal stress and strain remaining in the flat plate portion are relatively low. Accordingly, the end portion can be securely kept closed.

In addition, the recessed portions are formed with the depth not reaching the boundary between the one and other plates of the flat plate portion. For this reason, it is possible to inhibit a decrease in strength, and a decrease in durability strength with time.

A pipe-shaped member of a second invention is the pipe-shaped member according to the first invention, wherein the recessed portions are formed in a direction substantially perpendicular to the longitudinal direction of the flat plate portion.

According to the second invention, the recessed portions are formed in the direction substantially perpendicular to the longitudinal direction of the flat plate portion. For this reason, even in the case where the external forces are applied to the pipe-shaped member, the resistance is large, and the closing quality of the pipe-shaped member is accordingly increased. Furthermore, in a case where the pipe is formed by drawing, the strength of the pipe-shaped member is high.

A pipe-shaped member of a third invention is the pipe-shaped member according to the first invention, which includes a bent portion placed near an end edge of the flat plate portion, and formed by bending a part of the flat plate portion which is closer to the end edge than the recessed portions are. According to the third invention, the pipe-shaped member includes the bent portion formed by bending the part of the flat plate portion which is closer to the end edge than the recessed portions are. For this reason, the stabilizer can be attached while avoiding other members.

A pipe-shaped member of a fourth invention is the pipe-shaped member according to the third invention, wherein the number of the recessed portions formed in a surface of the flat plate portion on a side where the bent portion is formed is less than the number of the recessed portions formed in an opposite surface of the flat plate portion from the side where the bent portion is formed.

According to the fourth invention, the number of the recessed portions formed on the side where the metal is extended by the bending is greater than the number of the recessed portions formed on the side where the metal is shrunk by the bending. For this reason, it is possible to obtain the recessed portions corresponding to the shifts in the opposite directions due to the bending.

A pipe-shaped member of a fifth invention is the pipe-shaped member according to the third invention, wherein the number of the recessed portions formed in a surface of the flat plate portion on a side where the bent portion is formed is greater than the number of the recessed portions formed in an opposite surface of the flat plate portion from the side where the bent portion is formed.

According to the fifth invention, the number of the recessed portions formed on the side where the metal is extended by the bending is less than the number of the recessed portions formed on the side where the metal is shrunk by the bending. For this reason, it is possible to obtain the recessed portions corresponding to the shifts in the opposite directions due to the bending.

A pipe-shaped member of a sixth invention is the pipe-shaped member according to the first invention, wherein a depth dimension of the recessed portions is approximately 2.5 to approximately 6.6% of a value twice a metal thickness dimension of the tube.

According to the sixth invention, the end portion can be securely kept closed.

A pipe-shaped member of a seventh invention is the pipe-shaped member according to the first invention, which is a stabilizer linked to left and right suspension apparatuses to increase roll stiffness of a vehicle.

According to the seventh invention, it is possible to achieve the formation of the stabilizer from which the effects of the first pipe-shaped member can be obtained.

A method of closing a pipe-shaped member of an eighth invention is a method of closing an end portion of a pipe-shaped member formed from a hollow pipe, which includes the steps of: forming a flat plate portion by pressing at least one end portion of two end portions of the pipe; and forming groove-shaped recessed portions in one and another extended surfaces of the flat plate portion such that the flat plate portion has at least a substantially W-shape, in a direction crossing a longitudinal direction of the flat plate portion, and with a depth not reaching a boundary between one and another plates of the flat plate portion, the steps being performed by a first flat surface portion and a first projecting portion of a first die and a second surface portion and a second projecting portion of a second die.

According to the eighth invention, the end portion is formed in the flat plate shape, and the recessed portions are formed in the one and other extended surfaces in the flat plate shape such that the flat plate portion has at least a substantially W-shape. For this reason, even in a case where the external forces are applied to the pipe-shaped member, the end portion can be securely kept closed.

In addition, the recessed portions are formed with the depth not reaching the boundary between the one and other plates of the flat plate portion. For this reason, it is possible to inhibit a decrease in strength, and a decrease in durability strength with time.

A method of closing an end portion of a pipe-shaped member of a ninth invention is the method of closing an end portion of a pipe-shaped member according to the eighth invention, wherein the recessed portions are formed in a direction substantially perpendicular to the longitudinal direction of the flat plate portion.

According to the ninth invention, the recessed portions are formed in the direction substantially perpendicular to the longitudinal direction of the flat plate portion. For this reason, even in the case where the external forces are applied to the pipe-shaped member, the resistance is large, and the closing quality of the pipe-shaped member is accordingly increased. Furthermore, in a case where the pipe is formed by drawing, the strength of the pipe-shaped member is high.

A method of closing an end portion of a pipe-shaped member of a tenth invention is the method of closing an end portion of a pipe-shaped member according to the eighth invention, wherein a part of the flat plate portion which is closer to its end edge than the recessed portions are is bent.

According to the tenth invention, the bent portion is formed by bending the part of the flat plate portion which is closer to the end edge than the recessed portions are. For this reason, the stabilizer can be attached while avoiding other members.

A method of closing an end portion of a pipe-shaped member of an eleventh invention is the method of closing an end portion of a pipe-shaped member according to the eighth invention, wherein the number of the recessed portions formed in a surface of the flat plate portion on a side where the bent portion is formed is less than the number of recessed portions formed in an opposite surface of the flat plate portion from the side where the bent portion is formed.

According to the 11th invention, the number of recessed portions formed on the side where the metal is extended by the bending is greater than the number of recessed portions formed on the side where the metal is shrunk by the bending. For this reason, it is possible to obtain the recessed portions corresponding to the shifts in the opposite directions due to the bending, and to effectively inhibit the shifts in the opposite directions.

A method of closing an end portion of a pipe-shaped member of a twelfth invention is the method of closing an end portion of a pipe-shaped member according to the eighth invention, wherein the number of recessed portions formed in a surface of the flat plate portion on a side where the bent portion is formed is greater than the number of recessed portions formed in an opposite surface of the flat plate portion from the side where the bent portion is formed.

According to the 12th invention, the number of recessed portions formed on the side where the metal is extended by the bending is less than the number of recessed portions formed on the side where the metal is shrunk by the bending. For this reason, it is possible to obtain the recessed portions corresponding to the shifts in the opposite directions due to the bending, and to effectively inhibit the shifts in the opposite directions.

A method of closing an end portion of a pipe-shaped member of a thirteenth invention is the method of closing an end portion of a pipe-shaped member according to the eighth invention, wherein the pipe-shaped member is a stabilizer linked to left and right suspension apparatuses to increase roll stiffness of a vehicle.

According to the 13th invention, it is possible to achieve the formation of the stabilizer from which the effects of the eighth method of closing an end portion of a pipe-shaped member can be obtained.

Advantageous Effects of Invention

According to the present invention, it is possible to provide: a highly-durable and highly-reliable pipe-shaped member whose end portions are kept closed even in a case where the end portions are bent after closed; and a method of closing the end portions.

BRIEF DESCRIPTION OF DRAWINGS

FIGS. 6A and 6B are diagrams showing a process of: closing the end portion of the stabilizer by plastically deforming the end portion thereof into the flat plate shape; and bending the stabilizer.

DESCRIPTION OF EMBODIMENTS

Hereinafter, embodiments of the present invention will be described with reference to the accompanying drawings.

<<Embodiment 1>>

Figure 1:
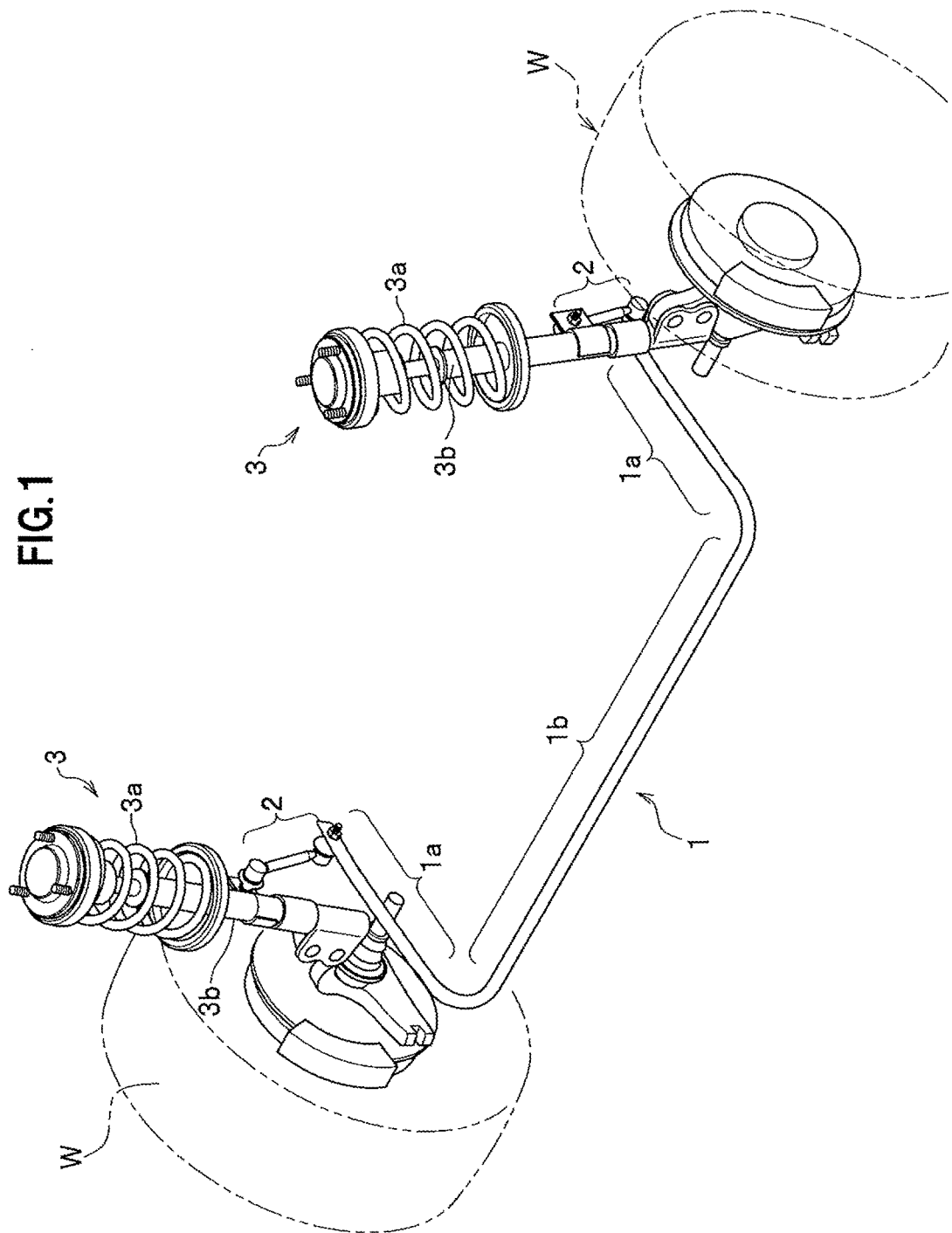
FIG. 1 is a perspective view showing a stabilizer of Embodiment 1 which is linked to left and right suspension apparatuses of a vehicle.

FIG. 1 is a perspective view showing a stabilizer of Embodiment 1 which is linked to left and right suspension apparatuses of a vehicle.

Left and right wheels W used for running a vehicle (not illustrated) are attached to a vehicle body (not illustrated) with their respective suspension apparatuses 3 installed in between. Each suspension apparatus 3 includes a coil spring 3*a,* and a shock absorber 3*b*. The shock absorber 3*b* rotatably supports the corresponding wheel W, as well as absorbs and reduces shocks applied to the shock absorber 3*b* from the wheel W in cooperation with the coil spring 3*a*.

The shock absorber 3*b* is attached to the vehicle body (not illustrated) with the coil spring 3*a* installed in between. Displacement of the wheel W is mitigated by: viscous damping force of the shock absorber 3*b* included in the suspension apparatus 3; and elastic force of the coil spring 3*a* included therein. Thereby, shakes of the vehicle body are inhibited.

A stabilizer 1 is connected to and between the suspension apparatuses 3 provided to the left and right wheels W. The stabilizer 1 serves as a torsion bar, and inhibits rolling of the vehicle by increasing roll stiffness of the vehicle body. Incidentally, the roll stiffness means stiffness against torsion which is caused by rolling motion of the vehicle body due to positional deviations of the left and right wheels W.

The stabilizer 1 joins the shock absorbers 3*b* of the two suspension apparatuses 3, 3 supporting the left and right wheels W, W which faces each other. The stabilizer 1 extends between one shock absorber 3*b* and the other shock absorber 3*b*. In other words, the stabilizer 1 is placed in a direction in which the left and right wheels W, W are placed side-by-side.

While the vehicle is turning, etc., difference in displacement amount between the two, or left and right shock absorbers 3*b,* 3*b* twist a torsion bar portion 1*b* in a central portion of the stabilizer 1. Elastic force of the torsion bar portion 1*b* recovers the torsion bar portion 1*b* from torsional deformation. Using the elastic force, the stabilizer 1 inhibits the rolling of the vehicle.

The stabilizer 1 and each shock absorber 3b are linked together with a link arm member 2 installed in between.

<Stabilizer 1>

Figure 2:
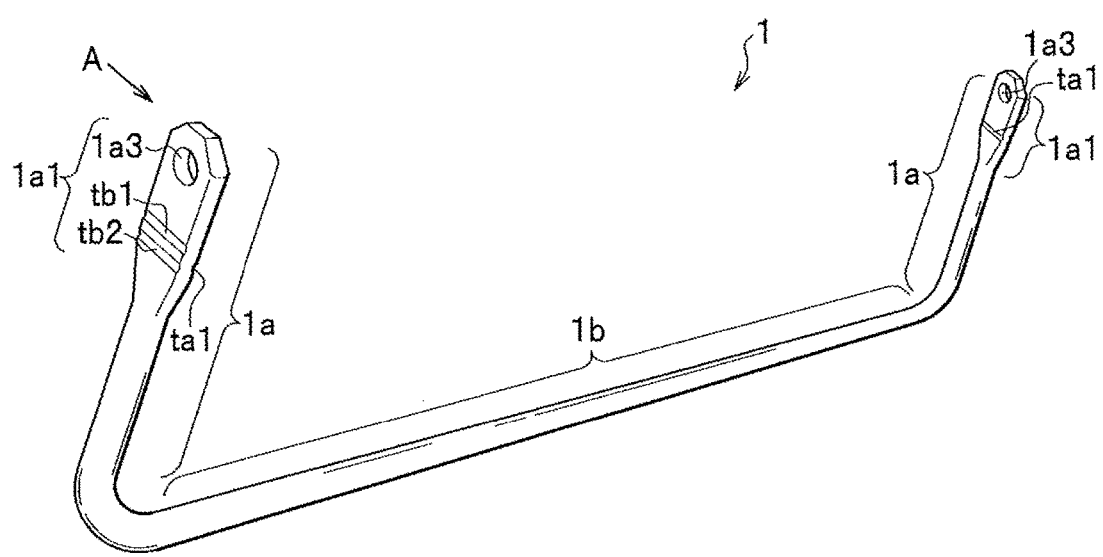
FIG. 2 is a perspective view showing the stabilizer.

FIG. 2 is a perspective view showing the stabilizer.

The stabilizer 1 is made from a hollow bar-shaped spring member (steel pipe) bent according to the shape of the vehicle.

The stabilizer 1 includes: torsion arm portions 1a; and the torsion bar portion 1b whose end portions the torsion arm portions 1a are respectively joined to.

Vertical displacements of the left and right wheels W are transmitted, as torsional deformation, by the pair of torsion arm portions 1a to the torsion bar portion 1b.

The torsion bar portion 1b has a shape of a straight bar. Using its own elastic force, the torsion bar portion 1b recovers from the torsional deformation transmitted from the left and right torsion arm portions 1a. Thereby, the torsion bar portion 1b works to return the pair of torsion arm portions 1a to their original positions.

The shapes of the left and right torsion arm portions 1a are symmetrical in the left-right direction. The left and right torsion arm portions 1a have the same configuration as each other. For these reasons, the following descriptions will be provided for one torsion arm portion 1a, and descriptions for the other torsion arm portion 1a will be omitted.

Figure 3:
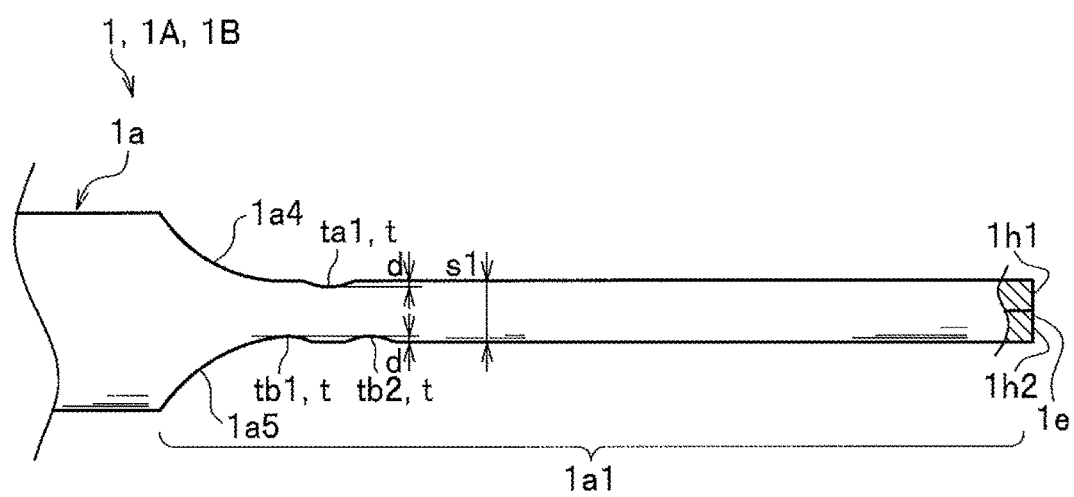
FIG. 3 is an A-direction arrow view of an end portion of a torsion arm portion of the stabilizer in an A direction of FIG. 2.

FIG. 3 is an A-direction arrow view of an end portion of the torsion arm portion of the stabilizer in an A direction of FIG. 2. The end portion 1a1 of the torsion arm portion 1a of the stabilizer 1 is closed by being plastically deformed into a flat plate portion, which includes groove-shaped recessed portions t (ta1, tb1, tb2).

The recessed portions t are each provided almost vertically to a longitudinal direction of the flat plate portion of the end portion 1a1 (see FIG. 2).

A central portion of the end portion 1a1 includes an insertion hole 1a3 (see FIG. 2) penetrated therein to be used for a bolt to be inserted through the insertion hole 1a3 when the link arm member 2 is attached to the stabilizer 1.

<Recessed Portions t in Flat Plate Portion (End Portion 1a1) of Stabilizer 1>

The flat plate portion of the end portion 1a1 of the stabilizer 1 shown in FIG. 3 includes: one recessed portion ta1 formed in one extended surface thereof; and two recessed portions tb1, tb2 formed in the other extended surface thereof.

As Example 1, for instance, two types of stabilizers 1A were formed from the pipe-shaped stabilizer 1 with a metal thickness of 3.8 mm, where: two flat plates resulting from plastically deforming the end portion 1a1 of the stabilizer 1 into the flat plate shape were each 3.8 mm in thickness; and a total thickness S1 of the end portion 1a1 was 7.6 mm representing the sum of the thicknesses of the respective two flat plates. One type of stabilizer 1A included the recessed portions ta1, tb1, tb2 each formed with a depth d of 0.3 mm against the total thickness S1 of 7.6 mm. The other type of stabilizer 1A included the recessed portions ta1, tb1, tb2 each formed with a depth d of 0.5 mm against the total thickness S1 of 7.6 mm.

The depth d of 0.3 mm was approximately 3.9% of the total thickness S1 of 7.6 mm, while the depth d of 0.5 mm was approximately 6.6% of the total thickness S1 of 7.6 mm.

As Example 2, two types of stabilizers 1B were formed from the pipe-shaped stabilizer 1 with a metal thickness of 6 mm, where: two flat plates resulting from plastically deforming the end portion 1a1 of the stabilizer 1 into the flat plate shape were each 6 mm in thickness; and a total thickness S1 of the end portion 1a1 was 12 mm representing the sum of the thicknesses of the respective two flat plates. One type of stabilizer 1B included the recessed portions ta1, tb1, tb2 each formed with a depth d of 0.3 mm against the total thickness S1 of 12 mm. The other type of stabilizer 1B included the recessed portions ta1, tb1, tb2 each formed with a depth d of 0.5 mm against the total thickness S1 of 12 mm.

The depth d of 0.3 mm was approximately 2.5% of the total thickness S1 of 12 mm, while the depth d of 0.5 mm was approximately 4.2% of the total thickness S1 of 12 mm.

The following test was carried out in order to check whether or not the end portion 1a1 of the stabilizer 1 was fully closed.

To put it specifically, each stabilizer 1A of Example 1 was cut at its center side. The end portion 1a1 of the stabilizer 1A of Example 1 was put underwater, and air was supplied into the stabilizer 1A through the cut opening. No bubble occurred from the end portion 1a1. Thereby, it was confirmed that no air leaked from the end portion 1a1.

Similarly, each stabilizer 1B of Example 2 was cut at its center side. The end portion 1a1 of the stabilizer 1B of Example 2 was put underwater, and air was supplied into the stabilizer 1B through the cut opening. It was confirmed that no air leaked from the end portion 1a1.

Figure 4A:
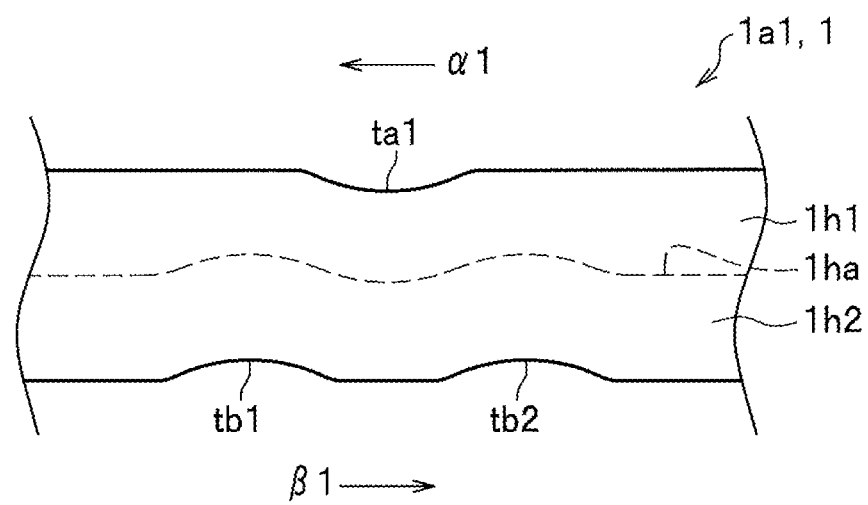
FIG. 4A is a side schematic view of a mating surface between two flat plates resulting from plastically deforming the end portion of the stabilizer of the embodiment into a flat plate shape.
Figure 4B:
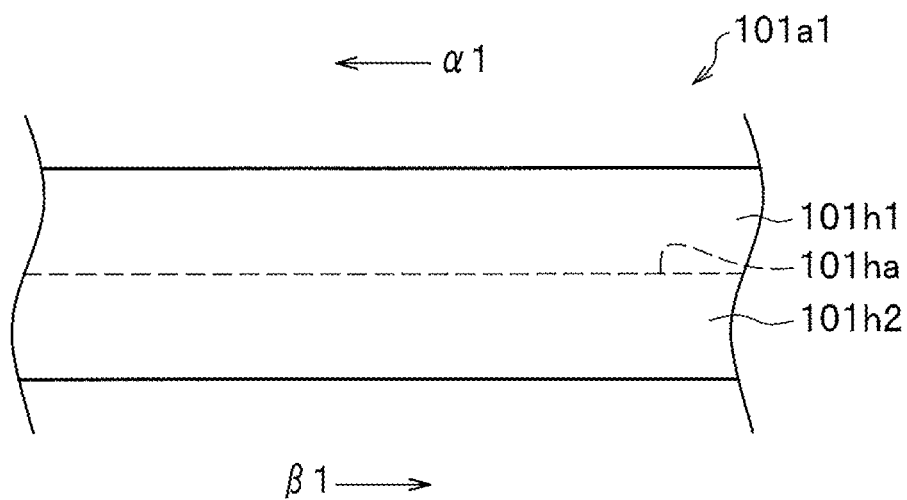
FIG. 4B is a side schematic view of a mating surface between two flat plates resulting from plastically deforming an end portion of a stabilizer of a comparative example into a flat plate shape.

FIG. 4A is a side schematic view of a mating surface between the two flat plates resulting from plastically deforming the end portion of the stabilizer of the embodiment into the flat plate shape. FIG. 4B is a side schematic view of a mating surface between the two flat plates resulting from plastically deforming an end portion of a (conventional) stabilizer of a comparative example into a flat plate shape.

In a case where external forces are applied to the end portion 1a1 of the stabilizer 1, for example in a case where an external force in a direction indicated with an arrow α1 is applied to one side of the end portion 1a1 while an external force in a direction indicated with an arrow β1 is applied to the other side of the end portion 1a1, the forming of the recessed portions ta1, tb1, tb2 in the plastically-deformed flat plate-shape end portion 1a1 of the stabilizer 1 provides resistance against the shifts in the opposite directions of the two flat plates 1h1, 1h2 in the plastically-deformed flat plate-shaped end portion 1a1, and keeps the end portion 1a1 closed. This is because as shown in FIG. 4A, the mating surface 1ha between the two flat plates 1h1, 1h2 is deformed in a wavy shape, or formed by compression in a wavy shape.

On the other hand, as shown in FIG. 4B for the comparative example, the mating surface 101ha between the two flat plates 101h1, 101h2 in the plastically-deformed flat plate-shaped end portion 101a1 is conventionally shaped like a flat surface. For this reason, one may consider that in a case where an external force in the direction indicated with the arrow α1 is applied to one side of the end portion 101a1 while an external force in the direction indicated with the arrow β1 is applied to the other side of the end portion 101a1, the mating surface 101ha provides no resistance against the shifts in the opposite directions of the two flat plates 101h1, 101h2, and the end portion 101a1 accordingly loses its closing quality, since the mating surface 101ha is not deformed in a wavy shape, or formed by compression in a wavy shape.

It should be noted that Examples 1 and 2 have been shown just as examples. Numerical values different from those shown in Examples 1 and 2 may be selected for the metal thickness dimension of the stabilizer 1 and the depth d dimension of the recessed portions t (ta1, tb1, tb2), depending on the necessity.

<Dies K1, K2 for Forming End Portion 1a1 of Stabilizer 1>

Figure 5A:
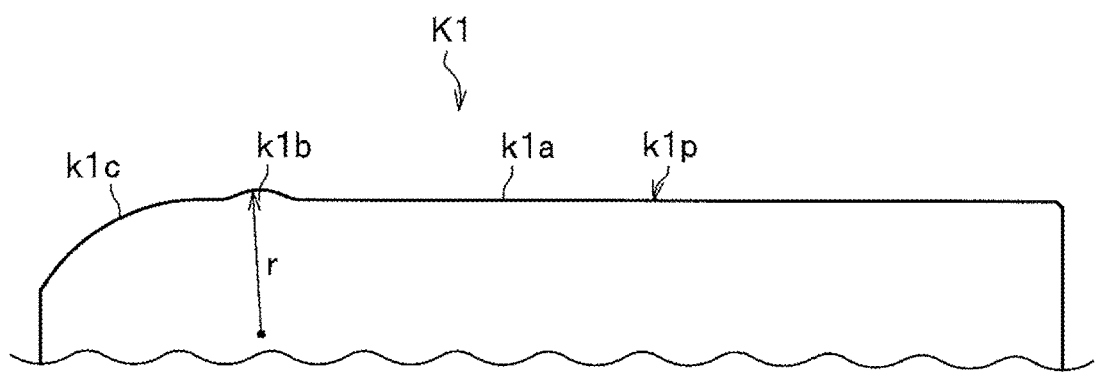
FIG. 5A is a side view of one die for: forming the end portion of the stabilizer into the flat plate shape; and forming one recessed portion in one surface of the end portion.
Figure 5B:
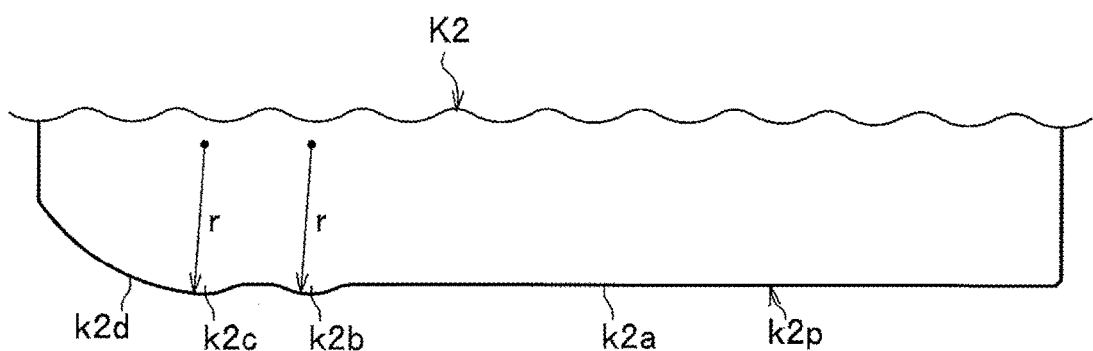
FIG. 5B is a side view of another die for: forming the end portion of the stabilizer into the flat plate shape; and forming two recessed portions in another surface of the end portion.

FIG. 5A is a side view of one die for: forming the end portion of the stabilizer into the flat plate shape; and forming one recessed portion in one surface of the end portion. FIG. 5B is a side view of another die for: forming the end portion of the stabilizer into the flat plate shape; and forming two recessed portions on the other surface of the end portion.

FIGS. 6A and 6B are diagrams showing a process of closing the end portion of the stabilizer by plastically deforming the end portion thereof into the flat plate shape.

First of all, as shown in FIG. 6B, the end portion 1a1 of the stabilizer 1 is formed into the flat plate shape. In addition, one recessed portion ta1 is formed in one extended surface of the end portion 1a1, while two recessed portions tb1, tb2 are formed in the other extended surface of the end portion 1a1.

The dies K1, K2 shown in FIGS. 5A and 5B are used for the above-mentioned process.

The one die K1 (see FIG. 5A) is a die for: forming the end portion 1a1 of the stabilizer 1 into the flat plate shape from one side; and forming the one recessed portion ta1 (see FIGS. 6A and 6B).

The die K1 includes a flat surface portion k1a, a projecting portion k1b and a rounded portion k1c formed on a press surface k1p. The flat surface portion k1a is that for forming the end portion 1a1 of the stabilizer 1 into the flat plate shape. The projecting portion k1b is that for forming the one recessed portion ta1. The rounded portion k1c is that for forming a press inclination portion 1a4 in one side the end portion 1a1 of the stabilizer 1.

The other die K2 (see FIG. 5B) is a die for: forming the end portion 1a1 of the stabilizer 1 into the flat plate shape from the other side; and forming the two recessed portions tb1, tb2 (see FIGS. 6A and 6B).

The die K2 includes a flat surface portion k2a, projecting portions k2b, k2c and a rounded portion k2d formed on a press surface k2p. The flat surface portion k2a is that for forming the end portion 1a1 of the stabilizer 1 into the flat plate shape. The projecting portions k2b, k2c are those for forming the two recessed portion tb1, tb2, respectively. The rounded portion k2d is that for forming another press inclination portion 1a5 on the other side of the end portion 1a1 of the stabilizer 1.

The projecting portion k1b of the one die K1 is formed with a curvature of a radius r.

Similarly, the projecting portions k2b, k2c of the other die K2 are each formed with a curvature of the radius r.

If the radius r of the projecting portions k1b, k2b, k2c is too small, the depth of the recessed portions ta1, tb1, tb2 in the end portion 1a1 of the stabilizer 1 is accordingly away from the depth d (see FIG. 3), and the configuration of the end portion 1a1 is close to that shown in FIG. 4B. This is not preferable. On the other hand, if the radius r of the projecting portions k1b, k2b, k2c is too large, the depth of the recessed portions ta1, tb1, tb2 in the end portion 1a1 thereof is accordingly away from the depth d (see FIG. 3), and the configuration of the end portion 1a1 is similarly close to that shown in FIG. 4B. This is not preferable, either.

For these reasons, it is desirable that the radius r be set to make the recessed portions ta1, tb1, tb2 in the end portion 1a1 of the stabilizer 1 deep enough to provide the resistance against the shifts in the opposite directions (see FIG. 4A).

It should be noted that the depth or the radius r does not have to be equal among the recessed portions ta1, tb1, tb2 as long as the recessed portions ta1, tb1, tb2 exert the desired effect and function.

<Process of Manufacturing Stabilizer 1>

Next, descriptions will be provided for a process of manufacturing the stabilizer 1.

To begin with, a steel pipe is cut into a predetermined length for the stabilizer 1 to be formed, and the steel pipe with the predetermined length is thereby prepared.

Subsequently, the steel pipe with the predetermined length is bent by a bender into a shape almost like the letter U, which is shown in FIG. 2.

Thereafter, the thus-bent steel pipe with the predetermined length (the material of the stabilizer 1) is hardened by quenching.

In this respect, as shown in FIG. 6A, the end portion 1a1 of the steel pipe with the predetermined length (the material of the stabilizer 1), which has been formed in the predetermined shape as well as has been quenched, is pipe-shaped. An end edge 1e of the end portion 1a1 is open.

Thereafter, the end portion 1a1 of the steel pipe (the material of the stabilizer 1) is pressed using: the die K1 as a lower die; and the die K2 as an upper die (see FIGS. 6A and 6B).

Thereby, the end portion 1a1 of the steel pipe with the predetermined length (the material of the stabilizer 1) is pressed from above by the press surface k2a of the die K2, as the upper die, which includes the flat surface portion k2a, the two projecting portions k2b, k2c and the rounded portion k2d. Simultaneously, the end portion 1a1 thereof is pressed from under by the press surface k1p of the die K1, as the lower die, which includes the flat surface portion k1a, the projecting portion k1b and the rounded portion k1c.

In this case, as shown in FIG. 6B, when the dies are pressed into contact with the end portion 1a1, pressure is applied to the recessed portion ta1 with the recessed portion ta1 restricted by the two recessed portions tb1, tb2 on the respective two sides of the recessed portion ta1. Thereby, it is possible to prevent the plastic deformation from coming out of place in a horizontal direction (in a left-right direction in FIG. 6B), and accordingly to prevent force for the plastic deformation from being dispersed.

The prevention can be achieved by, at least, the substantially W-shape, as shown in FIG. 6B, which is formed by the recessed portion tb1, the recessed portion ta1 and the recessed portion tb2. As an effect of that, the close-contact effect can be obtained even from the shallow unevenness.

Thereby, as shown in FIG. 6B, one surface of the end portion 1a1 of the steel pipe with the predetermined length (the material of the stabilizer 1) is formed into the flat plate shape (the flat plate portion) by the flat surface portion k2a of the die K2 as the upper die, and the recessed portions tb1, tb2 are formed in the surface of the end portion 1a1 thereof by the two projecting portions k2b, k2c of the die K2 as the upper die. Simultaneously, the other surface of the end portion 1a1 of the steel pipe with the predetermined length (the material of the stabilizer 1) is formed into the flat plate shape (the flat plate portion) by the flat surface portion k1a of the die K1 as the lower die, and the recessed portion ta1 is formed in the surface of the end portion 1a1 thereof by the one projecting portion k1b of the die K1 as the lower die. In this manner, the end portion 1a1 is formed into the flat plate shape, and the end edge 1e is blocked and closed.

Thereafter, the insertion hole 1a3 (see FIG. 2) is penetratingly provided to the central portion of the end portion 1a1 by a drill. Nevertheless, the insertion hole 1a3 may be penetratingly provided to the central portion of the end portion 1a1 by pressing for forming a through-hole.

Subsequently, the steel pipe (the material of the stabilizer 1) with the end edge 1e blocked is tempered, and toughness of the steel pipe is thereby increased. After that, the resultant steel pipe is heat-treated by shot peening. Thereby, scale (oxide film) is removed from the steel pipe.

After that, painting is applied to the steel pipe. With this, the stabilizer 1 (see FIG. 2) is completed.

By the above configuration, as shown in FIG. 3, the end portion 1a1 of the stabilizer 1 is closed by being plastically deformed into the flat plate-shaped end portion including the recessed portions ta1, tb1, tb2. Thereby, the recessed portion ta1 is formed in one surface of the end portion 1a1, and the recessed portions tb1, tb2 are formed in the other surface of the end portion 1a1, in the way that the end portion 1a1 has at least a shallow, substantially W-shape.

In this case, since the end portion 1a1 has at least a substantially W-shape, it is possible to obtain the close-contact effect of the end portion 1a1 even from the shallow unevenness, to form the recessed portions ta1, tb1, tb2 with the depth which does not reach the mating surface 1ha (see FIG. 4A) in the boundary between the flat plates 1h1, 1h2 in the end portion 1a, and to set a gentle curvature for the recessed portions ta1, tb1, tb2.

Accordingly, the plastic deformation and internal stress can be minimized to a furthest extent, and changes in dimensions with time can be reduced to a large extent. In addition, because the stress/strain can be reduced to a large extent, stress corrosion affecting the durability can be reduced to a large extent.

Moreover, changes in dimensions and strength, decrease in reliability, and deterioration in the close contact due to changes in external environments such as temperature, humidity, atmosphere and chemicals are less likely to occur. For this reason, the environmental durability, resistance against stress corrosion, weatherability can be enhanced to a large extent.

By these, a decrease in the strength of the end portion 1a1 of the stabilizer 1 can be inhibited. In addition, the stabilizer 1 can exert excellent durability and fatigue resistance against load repeatedly applied to the stabilizer 1, and can achieve an extended life of the close-contact effect.

Accordingly, it is possible to enhance the closing performance of the end portion 1a1 of the stabilizer 1 while inhibiting the decrease in the strength of the end portion 1a1 thereof.

Moreover, since the recessed portions ta1, tb1, tb2 are shallow in depth, the manufacturing facilities can be reduced in size, and the productivity can increase.

Accordingly, even though external forces are applied to the stabilizer 1, the shifts in the opposite directions of the closed portion of the end portion 1a1 of the stabilizer 1 can be inhibited (see FIG. 4A), and the end portion 1a1 is unlikely to lose its closing quality.

In contrast to this, if unlike in the present invention, the recessed portions were deeper beyond the mating surface 1ha between the flat plates 1h1, 1h2, stress caused by the bending of the stabilizer 1 by external forces would increase. This would raise new strength decrease problems such as a higher likelihood that the stabilizer 1 breaks at the end portion 1a1, and new productivity decrease problems such as a decrease in yields. In addition, this would make the plastic deformation larger, the internal stress too large, and changes in dimensions with time more likely to occur. Furthermore, this would make changes in dimensions, decrease in strength, decrease in reliability, and deterioration in the close contact, and the like more likely to occur due to the stress corrosion affecting the durability, and the changes in external environments.

Meanwhile, in this embodiment, the forming of the recessed portions ta1, tb1, tb2 makes the end portion 1a1 of the stabilizer 1 easy to deform plastically. Thus, the length of time for which the end portion 1a1 of the stabilizer 1 is held in a pressing step of, as shown in FIG. 6B, forming the end portion 1a1 thereof into the flat plate shape can be made shorter than conventionally needed. This enhances the productivity. One may consider that the reason for the shorter length of time for the holding is that the forming of the recessed portions ta1, tb1, tb2 makes the plastic deformation area larger than a plastic deformation area in a conventional flat shaped end portion having no recessed portion.

If the pressure-joining of flat portions by forging is performed by instantaneous pressing, the pressure-joined portion becomes open again after stopping applying load to the pressure-joined portion. For this reason, in order to prevent the pressure-joined portion from becoming open due to its behavior like a so-called backlash, the pressure-joined portion has to be held still under pressure for several seconds. However, Embodiment 1 can reduce the length of time for the holding thanks of a phenomenon which may be called an increase in hooking levels, although a detailed mechanism of the phenomenon has not be known yet. Accordingly, Embodiment 1 can contribute to a reduction in the number of steps, and an enhancement in productivity.

In addition, the recessed portions ta1, tb1, tb2 are formed in the direction substantially perpendicular to the longitudinal direction of the end portion 1a1. For this reason, even when external forces are applied to the stabilizer 1, maximum resistance against the shifts in the opposite directions can be obtained. Furthermore, in a case where the pipe of the stabilizer 1 is formed by drawing, maximum strength can be obtained since the recessed portions ta1, tb1, tb2 are formed in the direction substantially perpendicular to the longitudinal direction of the end portion 1a1.

<<Embodiment 2>>

Figure 7:
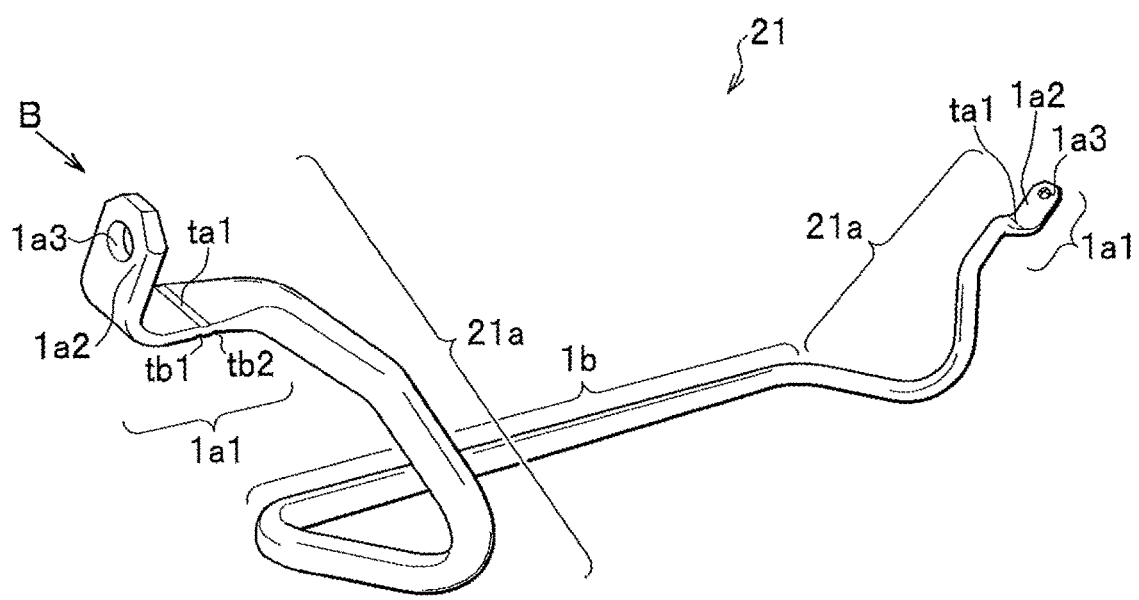
FIG. 7 is a perspective view showing a stabilizer of Embodiment 2.

FIG. 7 is a perspective view showing a stabilizer of Embodiment 2.

The stabilizer 21 of Embodiment 2 includes bent portions 1a2 formed by bending the end portions 1a1 of the torsion arm portions 1a of the stabilizer 1 of Embodiment 1.

The rest of the configuration of the stabilizer 21 of Embodiment 2 is the same as that of the stabilizer 1 of Embodiment 1. For this reason, the same components are denoted by the same reference signs, and detailed descriptions for such components will be omitted.

The stabilizer 21 is made from a hollow bar-shaped spring member (steel pipe) bent according to the shape of the vehicle depending on the necessity.

The stabilizer 21 includes: left and right torsion arm portions 21a; and the torsion bar portion 1b whose end portions the torsion arm portions 21a are respectively joined to.

The torsion bar portion 1b has a shape of a straight bar. Using its own elastic force, the torsion bar portion 1b recovers from the torsional deformation transmitted from the left and right torsion arm portions 21a. Thereby, the torsion bar portion 1b works to return the pair of torsion arm portions 21a to their original positions.

The bent portions 1a2 each having a bent shape are formed in the left and right torsion arm portions 21a. The shapes of the left and right torsion arm portions 21a are symmetrical in the left-right direction. The left and right torsion arm portions 21a have the same configuration as each other. For these reasons, the following descriptions will be provided for one torsion arm portion 21a, and descriptions for the other torsion arm portion 21a will be omitted.

Figure 8:
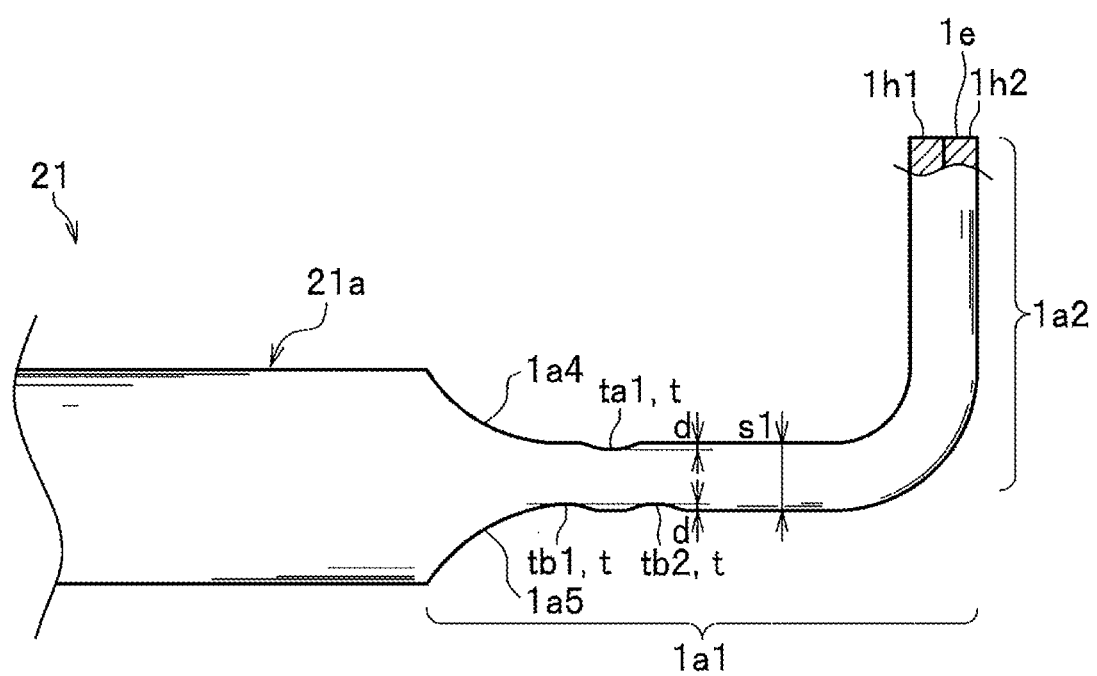
FIG. 8 is a B-direction arrow view of an end portion of a torsion arm portion of the stabilizer in a B direction of FIG. 7.

FIG. 8 is a B-direction arrow view of an end portion of the torsion arm portion of the stabilizer in a B direction of FIG. 7.

The end portion 1a1 of the torsion arm portion 21a of the stabilizer 21 is closed by being plastically deformed into a flat plate portion, which includes the groove-shaped recessed portions t (ta1, tb1, tb2). The bent portion 1a2 is formed by bending a part of the flat plate portion which is closer to the end edge than the recessed portions t are.

The recessed portions t are each provided almost vertically to the longitudinal direction of the flat plate portion of the end portion 1a1 (see FIG. 7).

A central portion of the bent portion 1a2 in the end portion 1a1 includes the insertion hole 1a3 penetrated therein to be used for a bolt to be inserted through the insertion hole 1a3 when the link arm member 2 is attached to the stabilizer 21.

Dies to be used to form the end portion 1a1 of the stabilizer 21 are the same as the dies K1, K2 (see FIGS. 5A and 5B) of Embodiment 1.

The following test was carried out in order to check whether or not the end portion 1a1 of the stabilizer 21 was fully closed.

To put it specifically, the stabilizer 21 was cut at its center side. The end portion 1a1 of the stabilizer 21 was put underwater, and air was supplied into the stabilizer 21 through the cut opening. No bubble occurred from the end portion 1a1. Thereby, it was confirmed that no air leaked from the end portion 1a1.

Figure 9A:
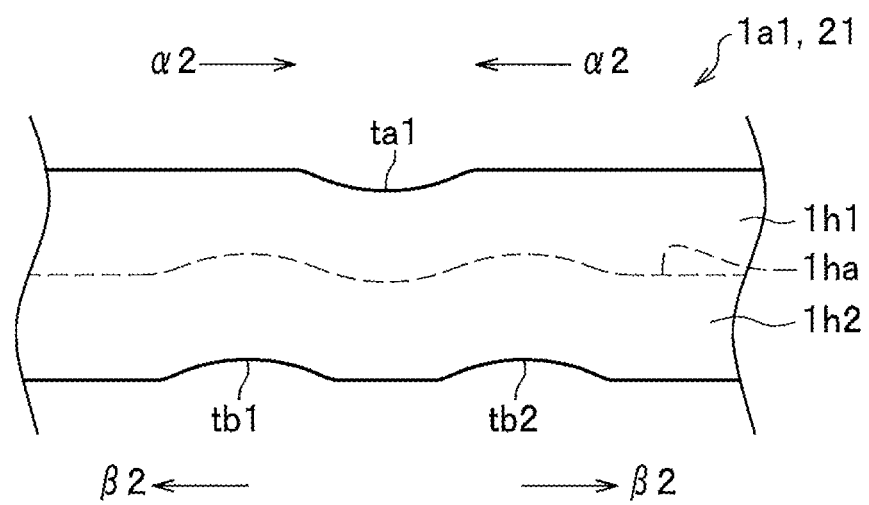
FIG. 9A is a side schematic view of a mating surface between two flat plates resulting from plastically deforming the end portion of the stabilizer of Embodiment 2 into a flat plate shape.
Figure 9B:
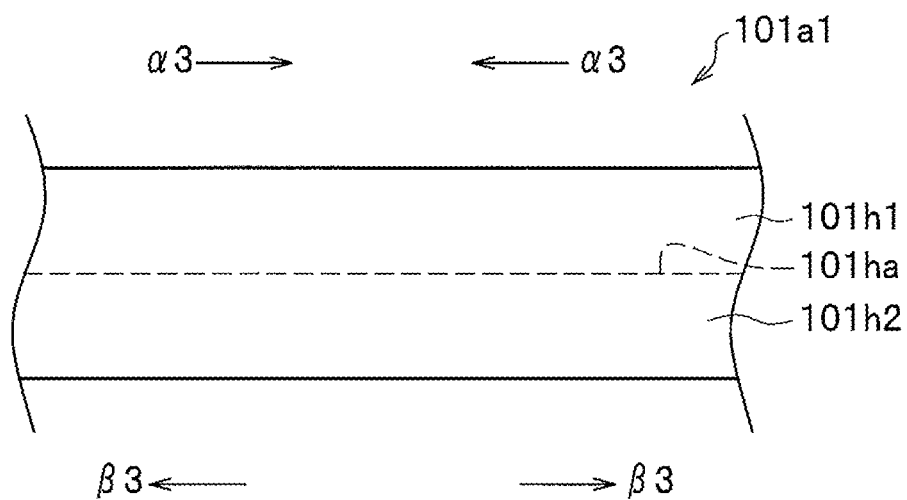
FIG. 9B is a side schematic view of a mating surface between two flat plates resulting from plastically deforming an end portion of a (conventional) stabilizer of a comparative example into a flat plate shape.

FIG. 9A is a side schematic view of a mating surface between two flat plates resulting from plastically deforming the end portion of the stabilizer of Embodiment 2 into a flat plate shape. FIG. 9B is a side schematic view of a mating surface between two flat plates resulting from plastically deforming the end portion of the (conventional) stabilizer of the comparative example into a flat plate shape.

It should be noted that when the bent portion 1a2 is formed by bending the end portion 1a1 of the stabilizer 21, the end portion 1a1 undergoes shrinkage deformation (as indicated with arrows α2 in FIG. 9A) on one side where the bent portion 1a2 is formed, and undergoes extensive deformation (as indicated with arrows β2 in FIG. 9A) on the other side of the end portion 1a1 where the bent portion 1a2 is formed.

However, the forming of the recessed portions ta1, tb1, tb2 in the end portion 1a1 of the stabilizer 21 provides resistance against the shifts in the opposite directions (see the arrows α2, β2 in FIG. 9A) of the two flat plates 1h1, 1h2 in the plastically-deformed flat plate-shaped end portion 1a1, and keeps the end portion 1a1 closed. This is because as shown in FIG. 9A, the mating surface 1ha between the two flat plates 1h1, 1h2 is deformed in a wavy shape, or formed by compression in a wavy shape. In addition, since the recessed portion ta1 is formed on the compressed side of the end portion 1a1 while the recessed portions tb1, tb2 are formed on the extended side of the end portion 1a1, the larger number of recessed portions formed on the extended side of the end portion 1a1 makes it possible to surely inhibit the shifts in the opposite directions.

On the other hand, as shown in FIG. 9B for the comparative example, the mating surface 101ha between the two flat plates 101h1, 101h2 in the plastically-deformed flat plate-shaped end portion 101a1 is conventionally shaped like a flat surface. For this reason, one may consider that the mating surface 101ha provides no resistance against the shifts in the opposite directions (indicated with arrows α3, β3 in FIG. 9B) of the two flat plates 101h1, 101h2, and the end portion 101a1 accordingly loses its closing quality.

<Process of Manufacturing Stabilizer 21>

Next, descriptions will be provided for a process of manufacturing the stabilizer 21.

To begin with, a steel pipe is cut into a predetermined length for the stabilizer 21 to be formed, and the steel pipe with the predetermined length is thereby prepared.

Subsequently, the steel pipe with the predetermined length is bent by a bender into a shape almost like the letter U, which is shown in FIG. 7.

Thereafter, the thus-bent steel pipe with the predetermined length (the material of the stabilizer 21) is hardened by quenching.

Figure 10A:
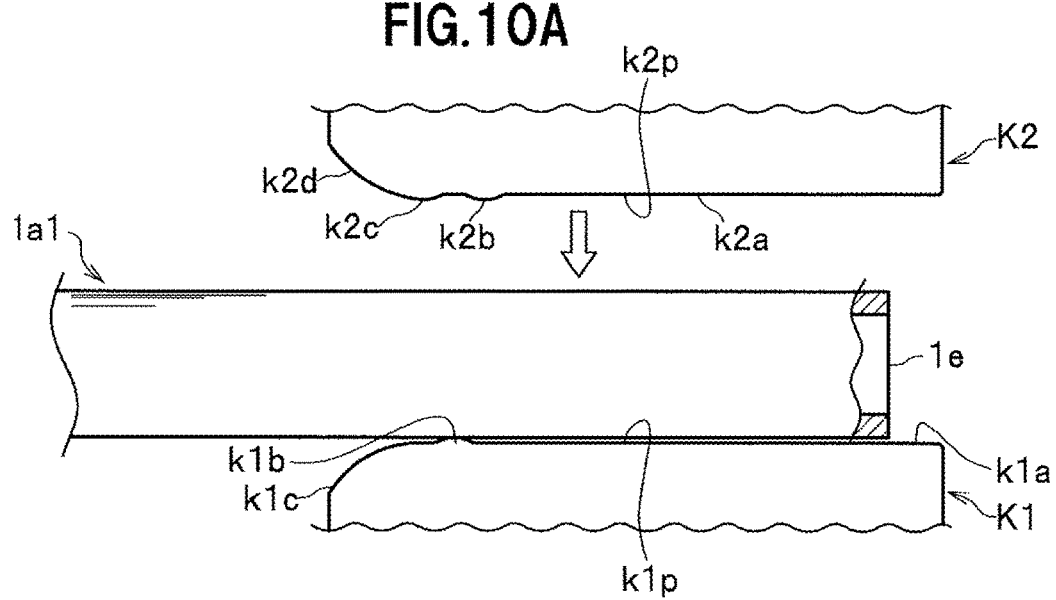
FIGS. 10A to 10C are diagrams showing a process of: closing the end portion of the stabilizer by plastically deforming the end portion thereof into the flat plate shape; and bending the stabilizer.
Figure 10B:
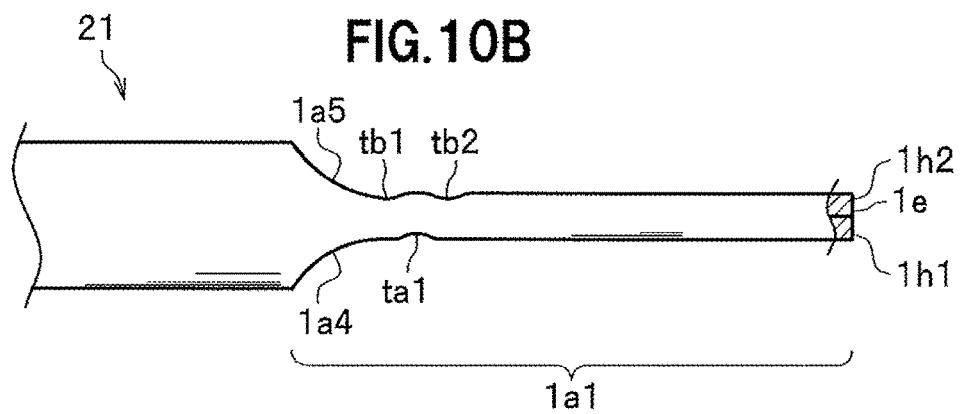
Figure 10C:
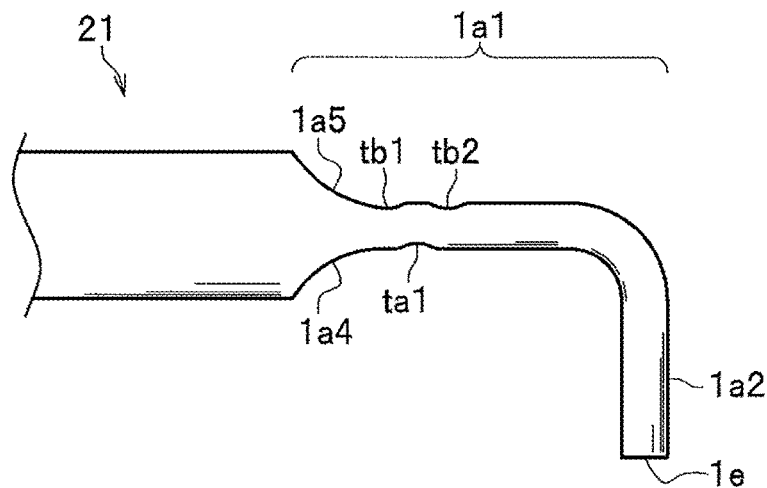

FIGS. 10A to 10C are diagrams showing a process of: closing the end portion of the stabilizer by plastically deforming the end portion thereof into the flat plate shape; and bending the end portion of the stabilizer.

As shown in FIG. 10A, the end portion 1a1 of the steel pipe with the predetermined length (the material of the stabilizer 21), which has been formed in the predetermined shape as well as has been quenched, is pipe-shaped. The end edge 1e of the end portion 1a1 thereof is open.

Thereafter, the end portion 1a1 of the steel pipe (the material of the stabilizer 21) is pressed using: the die K1 as a lower die; and the die K2 as an upper die (see FIGS. 10A and 10B).

By the pressing, the end portion 1a1 of the steel pipe with the predetermined length (the material of the stabilizer 21) is pressed from above by the press surface k2p of the die K2, as the upper die, which includes the flat surface portion k2a, the two projecting portions k2b, k2c and the rounded portion k2d. Simultaneously, the end portion 1a1 thereof is pressed from under by the press surface k1p of the die K1, as the lower die, which includes the flat surface portion k1a, the projecting portion k1b and the rounded portion k1c.

Thereby, as shown in FIG. 10B, one surface of the end portion 1a1 of the steel pipe with the predetermined length (the material of the stabilizer 21) is formed into the flat plate shape (the flat plate portion) by the flat surface portion k2a of the die K2 as the upper die, and the recessed portions tb1, tb2 are formed in the surface of the end portion 1a1 thereof by the two projecting portions k2b, k2c of the die K2 as the upper die.

Simultaneously, the other surface of the end portion 1a1 of the steel pipe with the predetermined length (the material of the stabilizer 21) is formed into the flat plate shape (the flat plate portion) by the flat surface portion k1a of the die K1 as the lower die, and the recessed portion ta1 is formed in the surface of the end portion 1a1 thereof by the one projecting portion k1b of the die K1 as the lower die. In this manner, the end portion 1a1 is formed into the flat plate shape, and the end edge 1e is blocked and closed.

In this case, as shown in FIG. 10B, when the dies are pressed into contact with the end portion 1a1, pressure is applied to the recessed portion ta1 with the recessed portion ta1 restricted by the two recessed portions tb1, tb2 on the respective two sides of the recessed portion ta1. Thereby, it is possible to prevent the plastic deformation from coming out of place in a horizontal direction (in a left-right direction in FIG. 10B), and accordingly to prevent force for the plastic deformation from being dispersed.

As in the case of Embodiment 1, the prevention can be achieved by, at least, the substantially W-shape, as shown in FIG. 10B, which is formed by the recessed portion tb1, the recessed portion ta1 and the recessed portion tb2. As an effect of that, the close-contact effect can be obtained even from the shallow unevenness.

Thereafter, as shown in FIG. 10C, the bent portion 1a2 is formed by bending downward the distal portion of the end portion 1a1 of the steel pipe with the predetermined length (the material of the stabilizer 21).

After that, the insertion hole 1a3 (see FIG. 7) is penetratingly provided to the central portion of the bent portion 1a2 of the end portion 1a1 by a drill.

Nevertheless, the insertion hole 1a3 may be penetratingly provided to the above-mentioned central portion of the end portion 1a1 by pressing for forming a through-hole, before bending downward the distal portion of the end portion 1a1, or after forming the end portion 1a1, shown in FIG. 10B, into the flat plate shape.

Subsequently, the steel pipe (the material of the stabilizer 21) with the end edge 1e blocked and the bent portion 1a2 formed therein is tempered, and toughness of the steel pipe is thereby increased. After that, the resultant steel pipe is heat-treated by shot peening. Thereby, scale (oxide film) is removed from the steel pipe.

After that, painting is applied to the steel pipe. With this, the stabilizer 21 (see FIG. 7) is completed.

By the above configuration, after the end portion 1a1 of the stabilizer 21 is closed by being plastically deformed into the flat plate-shaped end portion including the recessed portions ta1, tb1, tb2, the bent portion 1a2 is formed by bending the end portion 1a1. In this manner, the recessed portion ta1 is formed in one surface of the end portion 1a1, while the recessed portions tb1, tb2 are formed in the other surface of the end portion 1a1.

Accordingly, when the bent portion 1a2 is formed by bending, the shifts in the opposite directions in the closed portion of the end portion 1a1 of the stabilizer 21 can be inhibited (see FIG. 9A), and the end portion 1a1 is unlikely to lose its closing quality.

Besides, the length of time for which the end portion 1a1 of the stabilizer 21 is held in a pressing step of, as shown in FIG. 10B, forming the end portion 1a1 thereof into the flat plate shape is reduced to approximately 1 second from the conventional length of time of approximately 3 seconds. This is because the forming of the recessed portions ta1, tb1, tb2 makes the end portion 1a1 thereof easy to deform plastically.

Moreover, since the length of time needed for the pressing step of forming the end portion 1a1 of the stabilizer 21 into the flat plate shape is reduced, the process can proceed to a subsequent step of forming the bent portion 1a2 by bending the end portion 1a1 while the temperature of the end portion 1a1 still remains high. This makes it possible to enhance the workability in the subsequent step.

In addition, the recessed portions ta1, tb1, tb2 are formed in the direction substantially perpendicular to the longitudinal direction of the end portion 1a1. For this reason, maximum resistance against the shifts in the opposite directions due to the bending can be obtained. Furthermore, in a case where the pipe of the stabilizer 21 is formed by drawing, maximum strength can be obtained since the recessed portions ta1, tb1, tb2 are formed in the direction substantially perpendicular to the longitudinal direction of the end portion 1a1.

<<Embodiment 3>>

Figure 14:
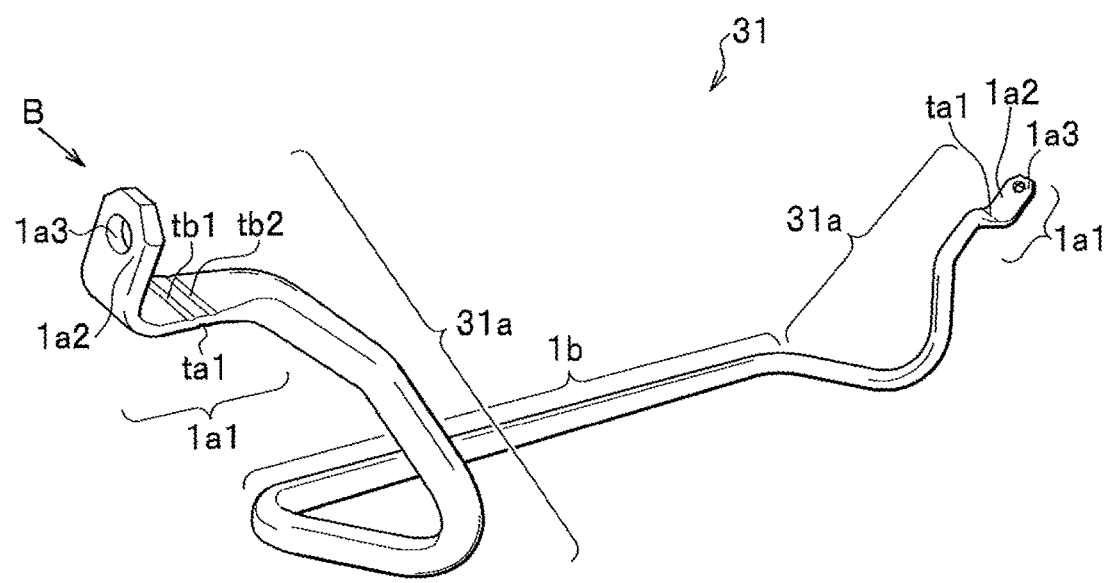
FIG. 14 is a perspective view showing a stabilizer of Embodiment 3.

FIG. 14 is a perspective view showing a stabilizer 31 of Embodiment 3.

The stabilizer 31 of Embodiment 3 has the same configuration as does the stabilizer 21 of Embodiment 2 (see FIG. 7), except for positions at which the one recessed portion ta1 and the two recessed portions tb1, tb2 are formed, albeit described later.

For this reason, the same components are denoted by the same reference signs, and descriptions for such components will be omitted whenever deemed possible.

What makes the stabilizer 31 of Embodiment 3 different from the stabilizer 21 of Embodiment 2 is that the one recessed portion ta1 and the two recessed portions tb1, tb2 formed in the opposing manner in the two surfaces (upper and lower surfaces) of the end portion 1a1 of the stabilizer 21 shown in FIG. 7 are formed the other way round, as shown in FIG. 14.

Figure 15:
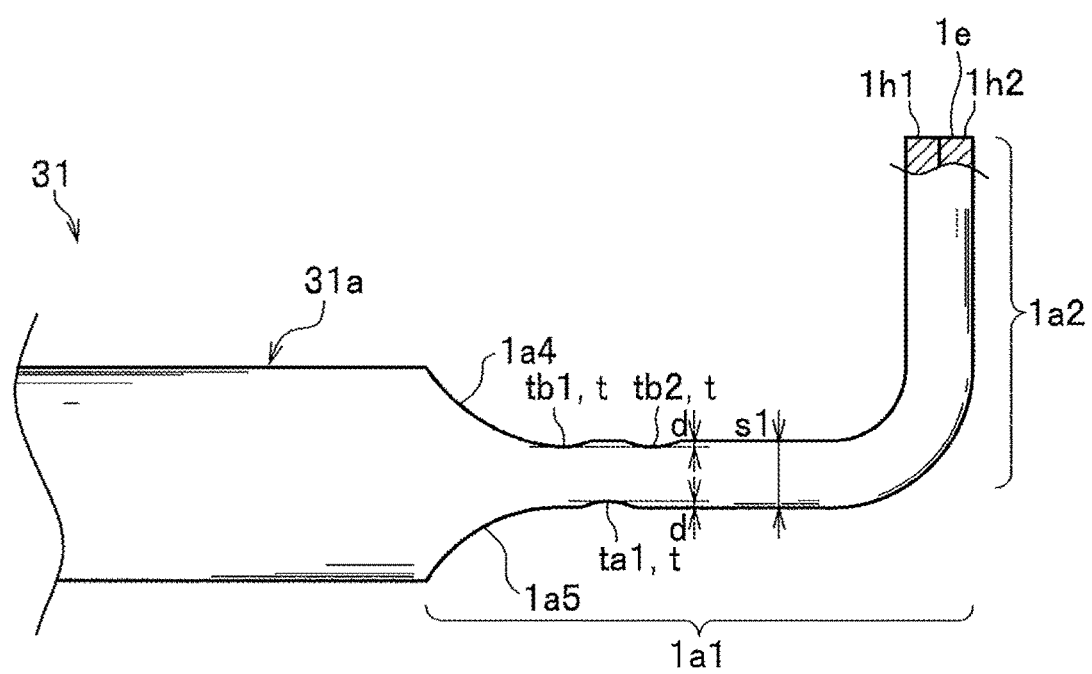
FIG. 15 is a B-direction arrow view of an end portion of a torsion arm portion of the stabilizer in a B direction of FIG. 14.

To put it specifically, as shown in FIG. 14, the two recessed portions tb1, tb2 are formed in the upper surface (one surface) of the end portion 1a1 of the stabilizer 31, while the one recessed portion ta1 is formed in the lower surface (the other surface) of the end portion 1a1 thereof. The substantially W-shape in the above-described stabilizer 21 resulting from forming the two recessed portions tb1, tb2 and the one recessed portion ta1 is reversed between the inner and outer sides of the bending in the stabilizer 31. In other words, in a view toward FIG. 14, the substantially W-shape in the stabilizer 21 is overturned into the shape almost like upside-down W in the stabilizer 31. FIG. 15 also shows the positions at which the recessed portions tb1, tb2 and the recessed portions ta1 are formed. FIG. 15 is a B-direction arrow view of the end portion 1a1 of the stabilizer 31 in a B direction of FIG. 14.

Figure 16:
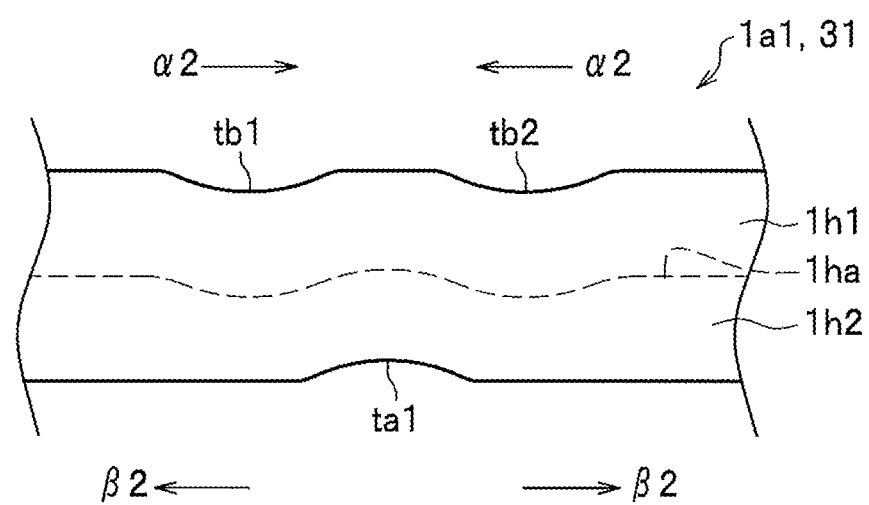
FIG. 16 is a side schematic view of a mating surface between two flat plates resulting from plastically deforming the end portion of the stabilizer of Embodiment 3 into a flat plate shape.

FIG. 16 is a side schematic view of a mating surface 1ha between two flat plates 1h1, 1h2 resulting from plastically deforming the end portion 1a1 of the stabilizer 31 of Embodiment 3 into a flat plate shape.

As shown in FIG. 16, when the bent portion 1a2 (see FIG. 14) is formed by bending the end portion 1a1 of the stabilizer 31, an inner peripheral surface of the bent portion 1a2 (a surface of the end portion 1a1 on one side where the bent portion is formed) undergoes shrinkage deformation as indicated with arrows α2, and an outer peripheral surface of the bent portion 1a2 (an opposite surface of the end portion 1a1 on the other side where the bent portion is formed) undergoes extensive deformation as indicated with arrows β2. During the shrinkage and extensive deformations, the mating surface 1ha between the two flat plates 1h1, 1h2 in the end portion 1a1 provides resistance against the shifts in the opposite directions of the two flat plates 1h1, 1h2, and keeps the end portion 1a1 closed, since the mating surface 1ha is formed in a wavy shape. Thereby, the end portion 1a1 is kept to be closed.

In this respect, in the stabilizer 21 of Embodiment 2, as shown in FIG. 7, the two recessed portions tb1, tb2 are formed in the outer peripheral surface of the end portion 1a1, while the one recessed portion ta1 is formed in a position on the inner peripheral surface of the end portion 1a1 which faces a middle position between the recessed portions tb1, tb2. For this reason, when the bent portion 1a2 (see FIG. 7) is formed by bending the end portion 1a1, as shown in FIG. 9A, forces of the extensive deformation (as indicated with the arrows β2) work in directions in which the two recessed portions tb1, tb2 go away from each other, and forces of the shrinkage deformation (as indicated with the arrows α2) work in directions in which the one recessed portion ta1 situated in the middle between the two recessed portions tb1, tb2 is pressed from the two sides. The way in which these forces work is similar to the way in which forces work on a folding fan when its outer peripheral side extends while revolving around a pivot. In other words, the forces work on the end portion 1a1 both in directions in which its outer peripheral side extends while revolving around the one recessed portion ta1 on its inner peripheral side, and in directions in which the two recessed portions tb1, tb2 go away from each other. In short, the forces which facilitate the bending of the end portion 1a1 in the bending direction work on the end portion 1a1.

In contrast to the stabilizer 21, in the stabilizer 31 of Embodiment 3, as shown in FIG. 14, the two recessed portions tb1, tb2 are formed in the inner peripheral surface of the end portion 1a1, while the one recessed portion ta1 is formed in the outer peripheral surface of the end portion 1a1.

For this reason, in the end portion 1a1 of the stabilizer 31, while being subjected to the same bending as described above, as shown in FIG. 16, forces of the extensive deformation (as indicated with the arrows β2) on the outer peripheral side work in directions in which the one recessed portion ta1 is pulled as if it were torn into two pieces, and forces of the shrinkage deformation (as indicated with the arrows α2) on the inner peripheral side work in directions in which the two recessed portions tb1, tb2 are pressed toward each other from the two sides. This condition can be likened to a condition where forces work on the above-mentioned fan, as placed upside down, both in directions in which the pivot of the fan is pulled as if it were torn into two pieces, and in direction in which the outer peripheral side of the fan is pressed from two sides. In other words, the forces work on the end portion 1a1 both in directions in which the two recessed portions tb1, tb2 on its inner peripheral side are pressed toward each other from the two sides, and in directions in which the one recessed portion ta1 on its outer peripheral side is pulled from two sides. In short, the forces which make the end portion 1a1 difficult to bend in the bending direction work on the end portion 1a1.

As described above, stronger resisting forces in the bending direction work on the end portion 1a1 in the stabilizer 31 of Embodiment 3 than in the stabilizer 21 of Embodiment 2. In other words, in the case where both the forces of the shrinkage deformation (as indicated with the arrows α2) and the forces of the extensive deformation (as indicated with the arrows β2) work on the end portion 1a1, stronger forces resisting both types of forces work on the end portion 1a1 in the stabilizer 31 than in the stabilizer 21 of Embodiment 2.

For this reason, the following effect can be obtained in a case where after the bent portions 1a2 are bent in the predetermined state shown in FIG. 14, the stabilizer 31 is attached to the suspension apparatuses 3 (see FIG. 1) of the vehicle using the bent portions 1a2.

In the case where both the forces of the shrinkage deformation (as indicated with the arrows α2) and the forces of the extensive deformation (as indicated with the arrows β2) work on the end portion 1a1 due to the positional deviations of the left and right wheels which are transmitted to the stabilizer 31 via the suspension apparatuses 3, the stronger forces resisting both types of forces work on the end portion 1a1 in the stabilizer 31 than in the stabilizer 21. Because the positional deviations of the left and right wheels can be inhibited by such resisting forces, it is possible to increase the roll stiffness.

<Process of Manufacturing Stabilizer 31>

Next, descriptions will be provided for a process of manufacturing the stabilizer 31.

To begin with, a steel pipe is cut into a predetermined length for the stabilizer 31 to be formed, and the steel pipe with the predetermined length is thereby prepared.

Subsequently, the steel pipe with the predetermined length is bent by a bender into a shape almost like the letter U, which is shown in FIG. 14.

Thereafter, the thus-bent steel pipe with the predetermined length (the material of the stabilizer 31) is hardened by quenching.

Figure 17A:
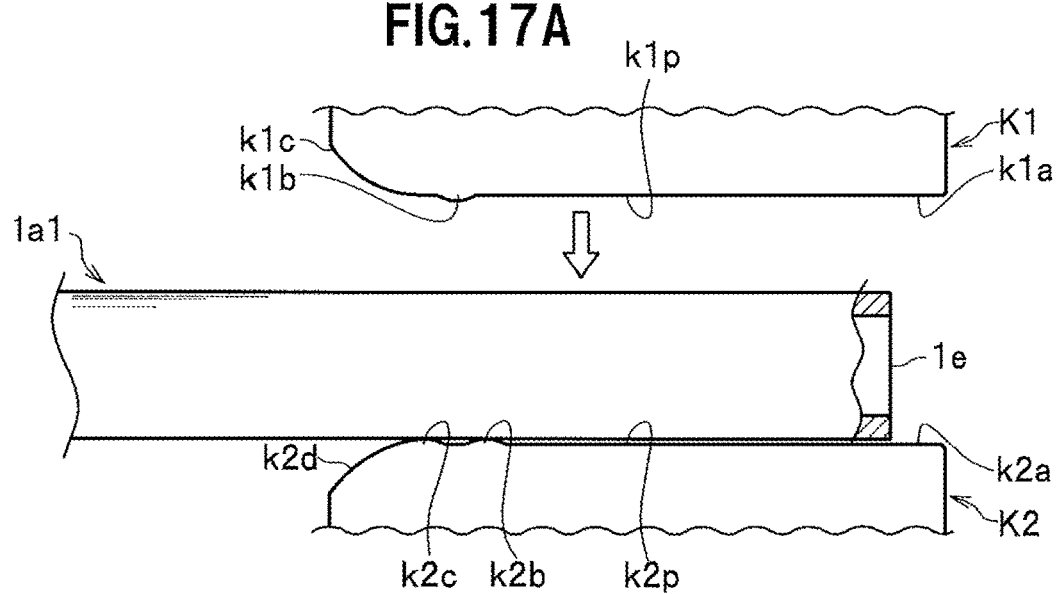
FIGS. 17A to 17C are diagrams showing a process of: closing the end portion of the stabilizer of Embodiment 3 by plastically deforming the end portion thereof into the flat plate shape; and bending the stabilizer.
Figure 17B:
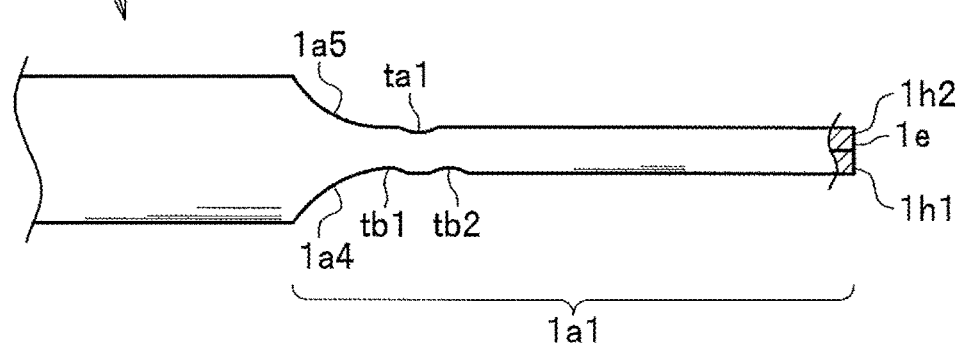
Figure 17C:
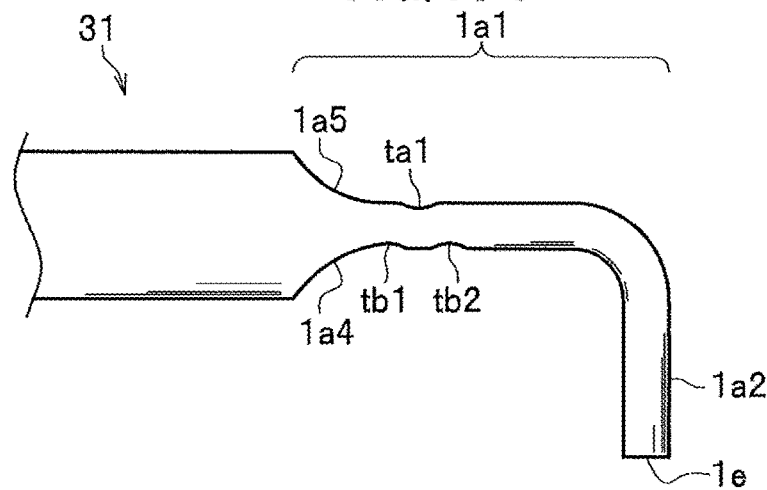

FIGS. 17A to 17C are diagrams showing a process of: closing the end portion 1a1 of the stabilizer 31 by plastically deforming the end portion 1a1 thereof into the flat plate shape; and bending the end portion 1a1 of the stabilizer 31.

As shown in FIG. 17A, the end portion 1a1 of the steel pipe with the predetermined length (the material of the stabilizer 31), which has been formed in the predetermined shape as well as has been quenched, is pipe-shaped. The end edge 1e of the end portion 1a1 thereof is open.

Thereafter, the end portion 1a1 of the steel pipe (the material of the stabilizer 31) is pressed using: the die K1 as the lower die; and the die K2 as the upper die (see FIGS. 17A and 17B). Incidentally, the dies K1, K2 (see FIGS. 5A and 5B) are the same as those of Embodiment 2.

By the pressing, the end portion 1a1 of the steel pipe with the predetermined length (the material of the stabilizer 31) is pressed from above by the press surface k1p of the die K1, as the upper die, which includes the flat surface portion k1a, the projecting portion k1b and the rounded portion k1c. Simultaneously, the end portion 1a1 thereof is pressed from under by the press surface k2p of the die K2, as the lower die, which includes the flat surface portion k2a, the two projecting portions k2b, k2c and the rounded portion k2d.

Thereby, as shown in FIG. 17B, one surface of the end portion 1a1 of the steel pipe with the predetermined length (the material of the stabilizer 31) is formed into the flat plate shape (the flat plate portion) by the flat surface portion k1a of the die K1 as the upper die, and the recessed portion ta1 is formed in the surface of the end portion 1a1 thereof by the one projecting portion k1b of the die K1 as the upper die.

Simultaneously, the other surface of the end portion 1a1 of the steel pipe with the predetermined length (the material of the stabilizer 31) is formed into the flat plate shape (the flat plate portion) by the flat surface portion k2a of the die K2 as the lower die, and the recessed portions tb1, tb2 are formed in the surface of the end portion 1a1 thereof by the two projecting portions k2b, k2c of the die K2 as the lower die. In this manner, the end portion 1a1 is formed into the flat plate shape, and the end edge 1e is blocked and closed.

In this case, as shown in FIG. 17B, when the dies are pressed into contact with the end portion 1a1, pressure is applied to the upper recessed portion ta1 with the recessed portion ta1 restricted by the two lower recessed portions tb1, tb2 on the respective two sides of the recessed portion ta1. Thereby, it is possible to prevent the plastic deformation from coming out of place as force in a horizontal direction (in a left-right direction in FIG. 17B), and accordingly to prevent the force from being dispersed.

As in the case of Embodiment 2, the prevention can be achieved by, at least, the substantially W-shape, as shown in FIG. 17B, which is formed by the one recessed portion tb1 and the two recessed portions ta1, ta2. As an effect of that, the close-contact effect can be obtained even from the shallow unevenness.

Thereafter, as shown in FIG. 17C, the bent portion 1a2 is formed by bending downward the distal portion of the end portion 1a1 of the steel pipe with the predetermined length (the material of the stabilizer 31).

After that, the insertion hole 1a3 (see FIG. 14) is penetratingly provided to the central portion of the bent portion 1a2 of the end portion 1a1 by a drill.

Nevertheless, the insertion hole 1a3 may be penetratingly provided to the above-mentioned central portion of the end portion 1a1 by pressing for forming a through-hole, before bending downward the distal portion of the end portion 1a1, or after forming the end portion 1a1, shown in FIG. 17B, into the flat plate shape.

Subsequently, the steel pipe (the material of the stabilizer 31) with the one edge 1e blocked and the bent portion 1a2 formed therein is tempered, and toughness of the steel pipe is thereby increased. After that, the resultant steel pipe is heat-treated by shot peening. Thereby, scale (oxide film) is removed from the steel pipe.

After that, painting is applied to the steel pipe. With this, the stabilizer 31 (see FIG. 14) is completed.

By the above configuration, after the end portion 1a1 of the stabilizer 31 is closed by being plastically deformed into the flat plate-shaped end portion including the one recessed portion ta1 and the two recessed portions tb1, tb2, the bent portion 1a2 is formed by bending the end portion 1a1. In this manner, the recessed portion ta1 is formed in one surface of the end portion 1a1, while the two recessed portions tb1, tb2 are formed in the other surface of the end portion 1a1.

Accordingly, when the bent portion 1a2 is formed by bending, the shifts in the opposite directions in the closed portion of the end portion 1a1 of the stabilizer 31 can be inhibited (see FIG. 16), and the end portion 1a1 is unlikely to lose its closing quality.

Besides, the length of time for which the end portion 1a1 of the stabilizer 31 is held in a pressing step of, as shown in FIG. 17B, forming the end portion 1a1 thereof into the flat plate shape is made shorter than conventionally needed. This is because the forming of the one recessed portion ta1 and the two recessed portions tb1, tb2 makes the end portion 1a1 thereof easy to deform plastically.

Moreover, since the length of time needed for the pressing step of forming the end portion 1a1 of the stabilizer 31 into the flat plate shape is reduced, the process can proceed to a subsequent step of forming the bent portion 1a2 by bending the end portion 1a1 while the temperature of the end portion 1a1 still remains high. This makes it possible to enhance the workability in the subsequent step.

In addition, the one recessed portion ta1 and the two recessed portions tb1, tb2 are formed in the direction substantially perpendicular to the longitudinal direction of the end portion 1a1. For this reason, maximum resistance against the shifts in the opposite directions due to the bending can be obtained. Furthermore, in a case where the pipe of the stabilizer 31 is formed by drawing, maximum strength can be obtained since the recessed portion ta1 and the two recessed portions tb1, tb2 are formed in the direction substantially perpendicular to the longitudinal direction of the end portion 1a1.

<Applied Example>

Figure 11A:
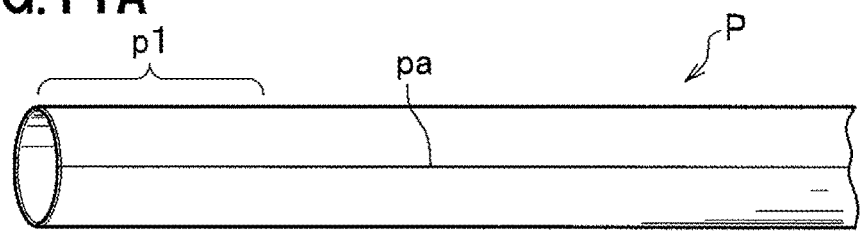
FIG. 11A is a diagram showing a process of forming an electric resistance welded steel pipe of an applied example.
Figure 11B:
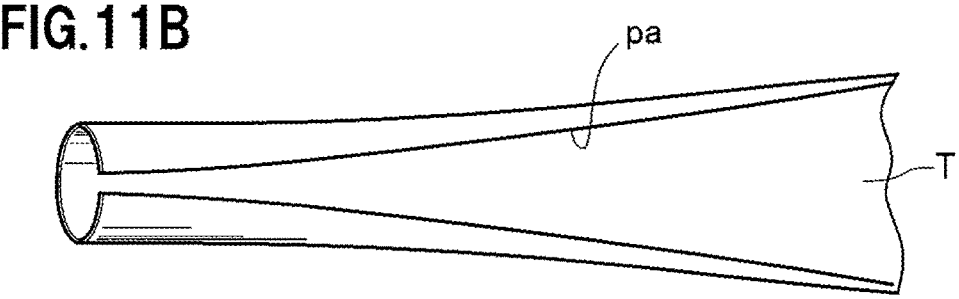
FIG. 11B is a perspective view showing the electric resistance welded steel pipe of the applied example.
Figure 11C:
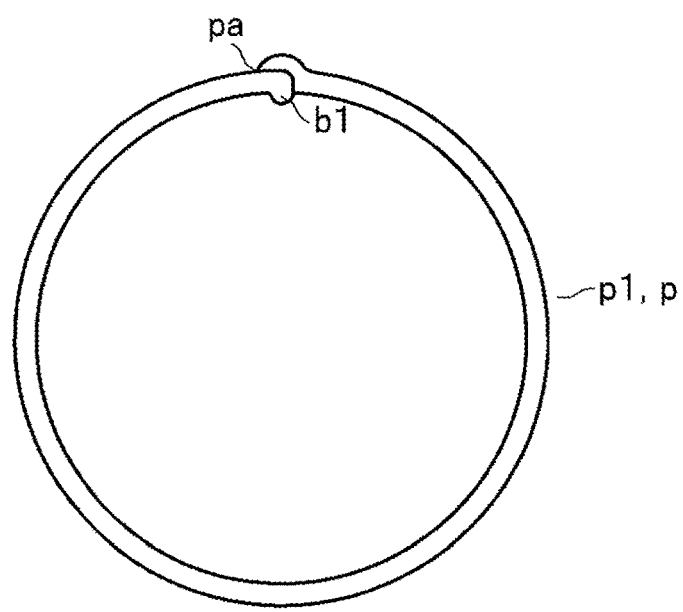
FIG. 11C is a magnified cross-sectional view of the electric resistance welded steel pipe of the applied example.
Figure 11D:
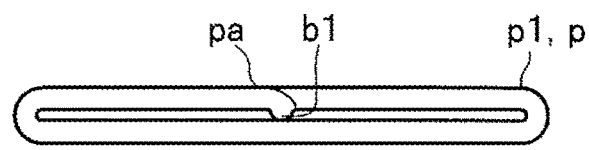
FIG. 11D is a magnified cross-sectional view of a part of the electric resistance welded steel pipe of the applied example, the part formed in a flat plate shape by being plastically deformed and thereby squeezed.
Figure 12:
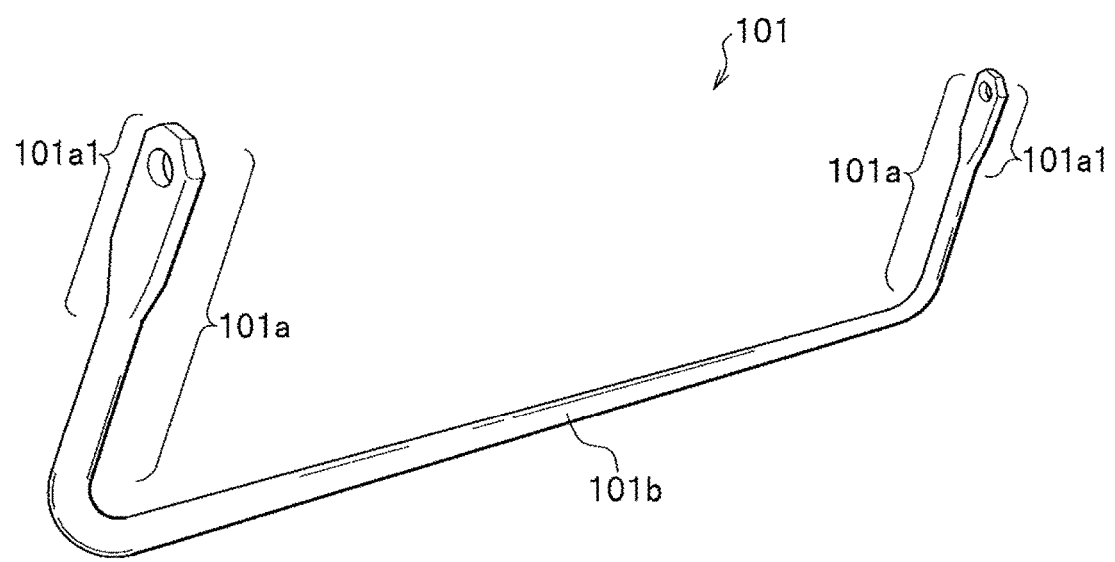
FIG. 12 is a perspective view showing a conventional stabilizer.
Figure 13:
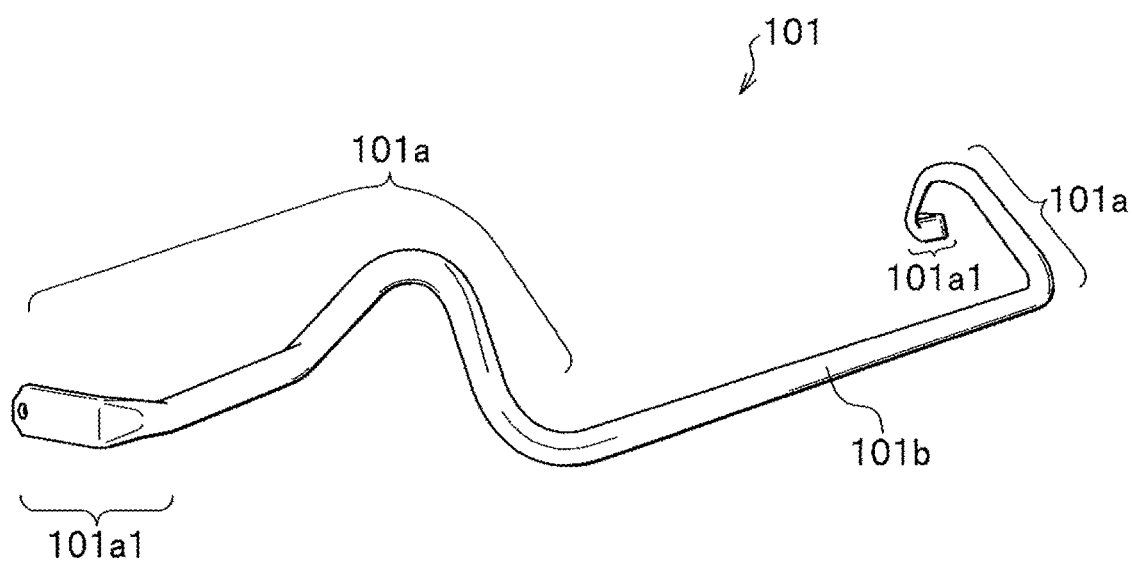
FIG. 13 is a perspective view showing another example of the conventional stabilizer.

FIG. 11A is a diagram showing a process of forming an electric resistance welded steel pipe of an applied example. FIG. 11B is a perspective view showing the electric resistance welded steel pipe of the applied example. FIG. 11C is a magnified cross-sectional view of the electric resistance welded steel pipe of the applied example. FIG. 11D is a magnified cross-sectional view of a part of the electric resistance welded steel pipe of the applied example, the part formed in a flat plate shape by being plastically deformed and thereby squeezed.

The applied example is an example where the present invention is applied to an electric resistance welded steel pipe p.

The electric resistance welded steel pipe p (see FIG. 11A) is a pipe-shape material formed by: rolling a steel sheet T into a pipe shape; and welding a seam (butting portion) pa of the thus-rolled sheet, as shown in FIG. 11B.

Since the electric resistance welded steel pipe p in the pipe shape is formed by welding, an inner bead b1 (see FIG. 11C) formed by the welding is left on the seam pa inside the electric resistance welded steel pipe p. Incidentally, an outer bead on the seam pa is removed.

For this reason, when an end portion p1 of the electric resistance welded steel pipe p is pressed into a flat plate shape, the bead b1 remains inside the electric resistance welded steel pipe p, as shown in FIG. 11D. This makes it difficult to close the end portion p1 of the electric resistance welded steel pipe p by pressing the end portion p1 thereof into the flat plate shape.

With this taken into consideration, the end portion p1 of the electric resistance welded steel pipe p is formed into a flat plate shape, and the recessed portions ta1, tb1, tb2 are formed in the thus-shaped end portion p1 thereof, in the same manner as is described for Embodiments 1, 2 and 3. This makes it possible to close the end portion p1 thereof. Thereafter, even though the end portion p1 thereof is bent, the end portion p1 is kept closed because of the effects shown in FIGS. 4A, 9A and 16.

The cost of the electric resistance welded steel pipe p is approximately 1/1.4 to approximately ½ of that of a pipe produced by extrusion. The production of a pipe with its end portion closed and bent can be achieved by using the electric resistance welded steel pipe p. Thus, the ability to close the end portion of the electric resistance welded steel pipe p leads to an enhanced durability and a gain in cost advantage.

It should be noted that: the configurations described for Embodiments 1, 2 and 3 are applicable to the applied example; and the applied example brings about the same operation/working-effects as do Embodiments 1, 2 and 3.

From above, even though the end portion 1a1 is bent after being closed, the end portion 1a1 is kept closed. Accordingly, the pipe-shaped member with high durability and reliability, as well as the method of closing the end portion of the pipe-shaped member can be achieved.

<<Other Embodiments>>

1. The foregoing embodiments have shown the case where: the recessed portions ta1, tb1, tb2 are formed in the end portion 1a1; and the end portion 1a1 has at least a shallow, substantially W-shape.

Nevertheless, it suffices that the end portion 1a1 at least includes recessed portions which make the end portion 1a1 having the substantially W-shape. The number of recessed portions may be increased from the recessed portions ta1, tb1, tb2.

However, an increase in the number of recessed portions makes the shape of the die complicated. With this taken into consideration, it is desirable that the recessed portions ta1, tb1, tb2 be formed in the end portion 1a1.

2. The foregoing embodiments have been described by citing the stabilizer 1 (21, 31) as the pipe-shaped member. Nevertheless, the present invention is applicable to a pipe-shaped member having a pipe shape which is different from that of the stabilizer 1 (21, 31).

3. The foregoing embodiments have shown the case where the two end portions of each of the stabilizers 21, 31 as the pipe-shaped member are closed and bent. Nevertheless, the configuration may be made such that either of the two end portions of the pipe-shaped member is closed and bent.

4. The foregoing embodiments have shown the case where the direction in which the recessed portions ta1, tb1, tb2 are formed is the direction substantially perpendicular to the longitudinal direction of the end portion 1a1 (the flat plate portion). Nevertheless, the direction in which the recessed portions ta1, tb1, tb2 are formed does not have to be inclined almost vertically to the longitudinal direction of the end portion 1a1 (the flat plate portion) of the stabilizer 1 (21, 31), as long as the direction crosses the longitudinal direction of the end portion 1a1.

However, in the case where the recessed portions ta1, tb1, tb2 are formed in the direction substantially perpendicular to the longitudinal direction of the end portion 1a1 (the flat plate portion), the maximum resistance against the shifts in the opposite directions due to the bending can be obtained. Moreover, in the case where the pipe-shaped members (stabilizers 1, 21, 31) are formed by drawing, their strengths are each at maximum. For this reason, it is most desirable that the recessed portions ta1, tb1, tb2 be formed in the direction substantially perpendicular to the longitudinal direction of the end portion 1a1 (the flat plate portion).

5. The one recessed portion ta1 and the two recessed portions tb1, tb2 formed in the end portion 1a1 of the stabilizer 1 (21, 31) as the pipe-shaped member are merely one example. The number of recessed portions and their dimensions may be arbitrarily selected as long as they exert the above-described effects.

6. The foregoing embodiments have shown the case where the recessed portion ta1 is formed in one extended surface of the flat plate portion of the end portion 1a1 of the stabilizer 1 (21, 31) while the recessed portions tb1, tb2 are formed in the other extended surface of the flat plate portion thereof. Nevertheless, even in a case where the recessed portions are formed in only either one or the other extended surface of the flat plate portion, a certain closing effect can be obtained by adjusting the depths of the recessed portions.

With this taken into consideration, the configuration may be such that the recessed portions are formed in only either one or the other extended surface of the flat plate portion of the end portion of each of the pipe-shaped members (the stabilizers 1, 21, 31). Furthermore, the configuration may be such that the two end portions of each of the pipe-shaped members (the stabilizers 1, 21, 31) are closed and bent with the recessed portions formed in only either one or the other surface of at least one of the two end portions of the pipe-shaped member. In this case, the press surface of one of the dies includes the flat surface portion and the projecting portions.

7. The foregoing embodiments have been described by citing the recessed portions ta1, tb1, tb2 whose cross-sectional shapes have the circular curvature. Nevertheless, the shapes of the recessed portions may be arbitrarily selected from non-circular shapes such as a trapezoidal shape, an elliptical shape and a quadratic-curve shape, as long as the predetermined closing effect can be obtained from the shapes.

8. The steel has been shown as the example of the material of the stabilizer 1 (21, 31) as the pipe-shaped member. Nevertheless, the material of the pipe-shaped member may be other than steel 9. It should be noted that the simultaneous performing of the above-described pressing shown in FIGS. 6A and 6B on the left and right end portions 1a1 shown in FIG. 2 makes it possible to inhibit dimensional errors, and accordingly to produce a homogeneous and high-quality stabilizer 1. For this reason, it is more desirable that the left and right end portions 1a1 be subjected to the above-described pressing at the same time.

Similarly, the simultaneous performing of the above-described pressing shown in FIGS. 10A and 10B or FIGS. 17A and 17B on the left and right end portions 1a1 shown in FIG. 7 or FIG. 14 makes it possible to inhibit dimensional errors, and accordingly to produce a homogeneous and high-quality stabilizer 21 or 31. For this reason, it is more desirable that the left and right end portions 1a1 be subjected to the above-described pressing at the same time.

10. The foregoing embodiments have described the various configurations. Nevertheless, different configurations may be made by employing parts of any one of the various configurations, or by combining parts of the various configurations, depending on the necessity.

11. The present invention is not limited to the foregoing embodiments. Design changes may be made to the present invention within a scope not departing from the gist of the present invention, whenever deemed necessary.

REFERENCE SIGNS LIST 1, 21, 31 stabilizer (pipe-shaped member)
3 suspension apparatus
1a1 end portion (flat plate portion)
1a2 bent portion
1h1, 1h2 flat plate (flat plate portion)
1ha mating surface (boundary)
K1 die (second die)
k1a flat surface portion (second flat surface portion)
k1b protrusion portion (second protrusion portion)
K2 die (first die)
k2a flat surface portion (first flat surface portion)
k2b, k2c projecting portion (first protrusion portion) ta1 recessed portion formed in one surface of a stabilizer end portion (recessed portion) having a flat plate shape tb1, tb2 recessed portion formed in another surface of a stabilizer end portion (recessed portion) having a flat plate shape

The invention claimed is:

1. A pipe-shaped member formed from a hollow pipe comprising:
   a flat plate portion positioned at at least one end portion of two end portions of the pipe, and formed in a flat plate shape, with groove-shaped recessed portions formed in first and second extended surfaces in the flat plate shape, the flat plate portion comprising first and second plates with a mating surface in a wavy shape, wherein
   the recessed portions are formed such that the flat plate portion has at least a substantially W-shape, in a direction crossing a longitudinal direction of the flat plate portion, and with a depth not reaching a boundary between the first and second plates of the flat plate portion.

2. The pipe-shaped member according to claim 1, wherein the recessed portions are formed in a direction substantially perpendicular to the longitudinal direction of the flat plate portion.

3. The pipe-shaped member according to claim 1, comprising
   a bent portion placed near an end edge of the flat plate portion, and formed by bending a part of the flat plate portion which is closer to the end edge than the recessed portions.

4. The pipe-shaped member according to claim 3, wherein the number of the recessed portions formed in a surface of the flat plate portion on a side where the bent portion is directed is less than the number of the recessed portions formed in an opposite surface of the flat plate portion from the side where the bent portion is directed.

5. The pipe-shaped member according to claim 3, wherein the number of the recessed portions formed in a surface of the flat plate portion on a side where the bent portion is directed is greater than the number of the recessed portions formed in an opposite surface of the flat plate portion from the side where the bent portion is directed.

6. The pipe-shaped member according to claim 1, wherein a depth dimension of the recessed portions is approximately 2.5 to approximately 6.6% of a value twice a metal thickness dimension of the tube.

7. The pipe-shaped member according to claim 1, being a stabilizer linked to left and right suspension apparatuses to increase roll stiffness of a vehicle.

8. A method of closing an end portion of a pipe-shaped member formed from a hollow pipe, comprising the steps of:
   forming a flat plate portion by pressing at least one end portion of two end portions of the pipe forming a mating surface in a wavy shape between the two end portions; and
   forming groove-shaped recessed portions in first and second extended surfaces of the flat plate portion such that the flat plate portion has at least a substantially W-shape, in a direction crossing a longitudinal direction of the flat plate portion, and with a depth not reaching a boundary between first and second plates of the flat plate portion,
   the steps being performed by a first flat surface portion and a first projecting portion of a first die and a second surface portion and a second projecting portion of a second die.

9. The method of closing an end portion of a pipe-shaped member, according to claim 8, wherein the recessed portions are formed in a direction substantially perpendicular to the longitudinal direction of the flat plate portion.

10. The method of closing an end portion of a pipe-shaped member, according to claim 8, wherein a part of the flat plate portion which is closer to its end edge than the recessed portions are is bent.

11. The method of closing an end portion of a pipe-shaped member, according to claim 8, wherein the number of the recessed portions formed in a surface of the flat plate portion on a side where the bent portion is formed is less than the number of the recessed portions formed in an opposite surface of the flat plate portion from the side where the bent portion is formed.

12. The method of closing an end portion of a pipe-shaped member, according to claim 8, wherein the number of the recessed portions formed in a surface of the flat plate portion on a side where the bent portion is formed is greater than the number of the recessed portions formed in an opposite surface of the flat plate portion from the side where the bent portion is formed.

13. The method of closing an end portion of a pipe-shaped member, according to claim 8, wherein the pipe-shaped member is a stabilizer linked to left and right suspension apparatuses to increase roll stiffness of a vehicle.

* * * * *